(12) United States Patent
Bell et al.

(10) Patent No.: US 12,005,478 B2
(45) Date of Patent: *Jun. 11, 2024

(54) MULTI-TIERED PARCEL SORTATION SYSTEM

(71) Applicant: United Parcel Service Of America, Inc., Atlanta, GA (US)

(72) Inventors: Julian Leland Bell, Decatur, GA (US); Gregory Casanova Brown, II, Lilburn, GA (US); Stephens Woodrough, Peachtree Corners, GA (US); Dameion Teres Drake, Lithonia, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,228

(22) Filed: Feb. 8, 2023

(65) Prior Publication Data
US 2023/0191457 A1    Jun. 22, 2023

Related U.S. Application Data

(63) Continuation of application No. 17/217,192, filed on Mar. 30, 2021, now Pat. No. 11,607,711.
(Continued)

(51) Int. Cl.
*B07C 3/00* (2006.01)
*B65G 1/04* (2006.01)

(52) U.S. Cl.
CPC .............. *B07C 3/008* (2013.01); *B07C 3/006* (2013.01); *B65G 1/0464* (2013.01);
(Continued)

(58) Field of Classification Search
CPC ....... B07C 3/006; B07C 3/008; B65G 1/0464; B65G 1/0478; B65G 2201/0283; B65G 2201/0285
See application file for complete search history.

(56) References Cited

U.S. PATENT DOCUMENTS

| | | |
|---|---|---|
| 8,230,141 B2 | 7/2012 | Zimmermann |
| 11,066,237 B2 | 7/2021 | Lindbo et al. |

(Continued)

FOREIGN PATENT DOCUMENTS

EP    2322290 A2    5/2011

*Primary Examiner* — Saul Rodriguez
*Assistant Examiner* — Ashley K Romano
(74) *Attorney, Agent, or Firm* — Shook, Hardy & Bacon L.L.P.

(57) ABSTRACT

A multi-tiered automated parcel sortation system is utilized to sort parcels according to a common destination. A first tier includes an automated sorter configured to transport parcels from a source location to a release destination. A second tier includes accumulation containers each associated with a shipping destination, and the release destination within the first tier is a positioned directly above the accumulation container associated with the shipping destination of the parcel. Once transported to the release destination, a parcel is released into the accumulation container, and once the accumulation container is filled, the accumulation of parcels within the container is released into a third tier, which may include conveyors or autonomous guided vehicles with transport containers. In the third tier, the parcels are transported away for further processing.

20 Claims, 14 Drawing Sheets

Related U.S. Application Data

(60) Provisional application No. 63/002,846, filed on Mar. 31, 2020.

(52) U.S. Cl.
CPC .... *B65G 1/0478* (2013.01); *B65G 2201/0285* (2013.01); *B65G 2203/0283* (2013.01)

(56) References Cited

U.S. PATENT DOCUMENTS

| | | | |
|---|---|---|---|
| 2015/0098775 A1* | 4/2015 | Razumov | B65G 1/0407 414/807 |
| 2018/0148259 A1* | 5/2018 | Gravelle | B65G 1/04 |
| 2018/0194571 A1* | 7/2018 | Fryer | B65G 1/02 |
| 2018/0273297 A1 | 9/2018 | Wagner et al. | |
| 2018/0282066 A1 | 10/2018 | Wagner et al. | |
| 2018/0319590 A1* | 11/2018 | Lindbo | B65G 1/0464 |
| 2019/0031446 A1* | 1/2019 | Hognaland | B08B 1/008 |
| 2019/0225436 A1* | 7/2019 | Lindbo | B25J 15/0052 |
| 2019/0232925 A1* | 8/2019 | Hognaland | H02J 7/0045 |
| 2019/0300286 A1* | 10/2019 | Hognaland | B65G 1/1378 |
| 2019/0322452 A1* | 10/2019 | Austrheim | B65G 1/1373 |
| 2019/0375590 A1* | 12/2019 | Gravelle | B65G 1/04 |
| 2020/0324971 A1 | 10/2020 | Ingram-Tedd et al. | |
| 2021/0114811 A1 | 4/2021 | Clark et al. | |

\* cited by examiner

MULTI-TIERED PARCEL SORTATION SYSTEM

CROSS-REFERENCE TO RELATED APPLICATIONS

This application entitled "Multi-Tiered Parcel Sortation System," is a continuation of and claim the benefit of U.S. Nonprovisional application Ser. No. 17/217,192, entitled "Multi-Tiered Parcel Sortation System" and filed Mar. 30, 2021, which claims the benefit of U.S. Prov. App. 63/002,846, entitled "Multi-Tiered Parcel Sortation System," and filed Mar. 31, 2020. The entireties of the aforementioned applications are incorporated by reference herein.

BACKGROUND

Sorting parcels according to their assigned destination is a critical step for efficient delivery and supply management systems. While many aspects of parcel handling and transportation have become automated, sortation of parcels often involves precision in manipulating the parcels, particularly with parcels of a smaller size, which makes automation challenging. For this reason, many current methods of sorting parcels include manual sortation with some automated assistance. Attempts to automate fully manual and semi-manual sortation methods have involved using an articulated robotic arm to receive the parcel and place the parcel within an assigned cubby within a vertical wall, which is inefficient to due to the kinematics of industrial arms. Additionally, robotic arms typically cannot finesse the positioning of parcels within the cubby to ensure maximum packaging. As a result, fewer parcels may fit within the cubby before it needs to be emptied. As such, these attempts at automation have been inefficient in that they do not achieve the current throughput rates of the manual sortation systems. Additionally, in some instances, the use of robotic arms to sort parcels along a vertical wall requires more space than what is allotted for parcel sortation within existing infrastructure.

SUMMARY

At a high level, aspects described herein relate to a multi-tiered automated parcel sortation system that is utilized to sort parcels according to a common destination. A first tier includes an automated sorter that is configured to transport parcels from a source location to a release destination. The first tier is positioned above a second tier that includes accumulation containers each associated with a shipping destination. A transported parcel's release destination within the first tier is positioned directly above the accumulation container that is associated with the shipping destination of the parcel. Once transported by the automated sorter to the release destination, the parcel is released into the accumulation container while other parcels may be sorted in a similar manner.

In some embodiments, the first tier includes a plurality of tracks, and the automated sorter that transports the parcel within the first tier is an autonomous guided vehicle (AGV) that moves along the tracks with a parcel, which may be placed on a tray within or attached to the AGV body. The parcel may be dropped, slid, or otherwise released from the tray or AGV body when the AGV reaches the release destination on the tracks. In other embodiments, the first tier includes a grid of omnidirectional transfer units (OTUs) that transfer a parcel from one OTU to an adjacent OTU until the parcel reaches a release OTU, which is the OTU positioned above the corresponding accumulation container. Each OTU may have a detachable portion, such as a set of bomb-bay style doors, such that when the parcel is on the release OTU, a temporary opening may be created (for example, by opening the bomb-bay style doors) through which the parcel may be released into the accumulation container. This process may continue for multiple parcels.

Once an accumulation container is filled with parcels having a shipping destination assigned to the container, the accumulation of parcels within that container is released to a third tier positioned directly below the second tier. One or more sensors may be used in determining whether the container is full. For example, a weight sensor may determine the weight of the accumulation of parcels within the container, and the accumulation may be released when an accumulation threshold is satisfied. Alternatively, volume of parcels and/or height of parcels (which includes distance from the top of the container) may be utilized to determine whether an accumulation threshold is satisfied.

In the third tier, the parcels are transported away for further processing within the shipping network. The parcels may go on to additional processing within a storage or logistics facility or may go to a truck to be transported to another destination within the parcels' shipping routes. In both cases, the parcels are transported from an area directly below the accumulation container to a perimeter of the sortation system or outside of the sortation system. The parcels may be transported within the third tier by a conveyor. In some aspects, the conveyor has a transport container that receives the parcels after they are released from the accumulation container, and in other aspects, the parcels are released directly onto the conveyor. In some aspects, the parcels are transported around the third tier by an autonomous guided vehicle that positions a transport container directly under the accumulation container and then transports the filled transport container once the parcels are received.

This summary is intended to introduce a selection of concepts in a simplified form that is further described in the Detailed Description section of this disclosure. The Summary is not intended to identify key or essential features of the claimed subject matter, nor is it intended to be used in determining the scope of the claimed subject matter. Additional objectives, advantages, and novel features of the technology will be set forth in part in the description that follows, and it will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
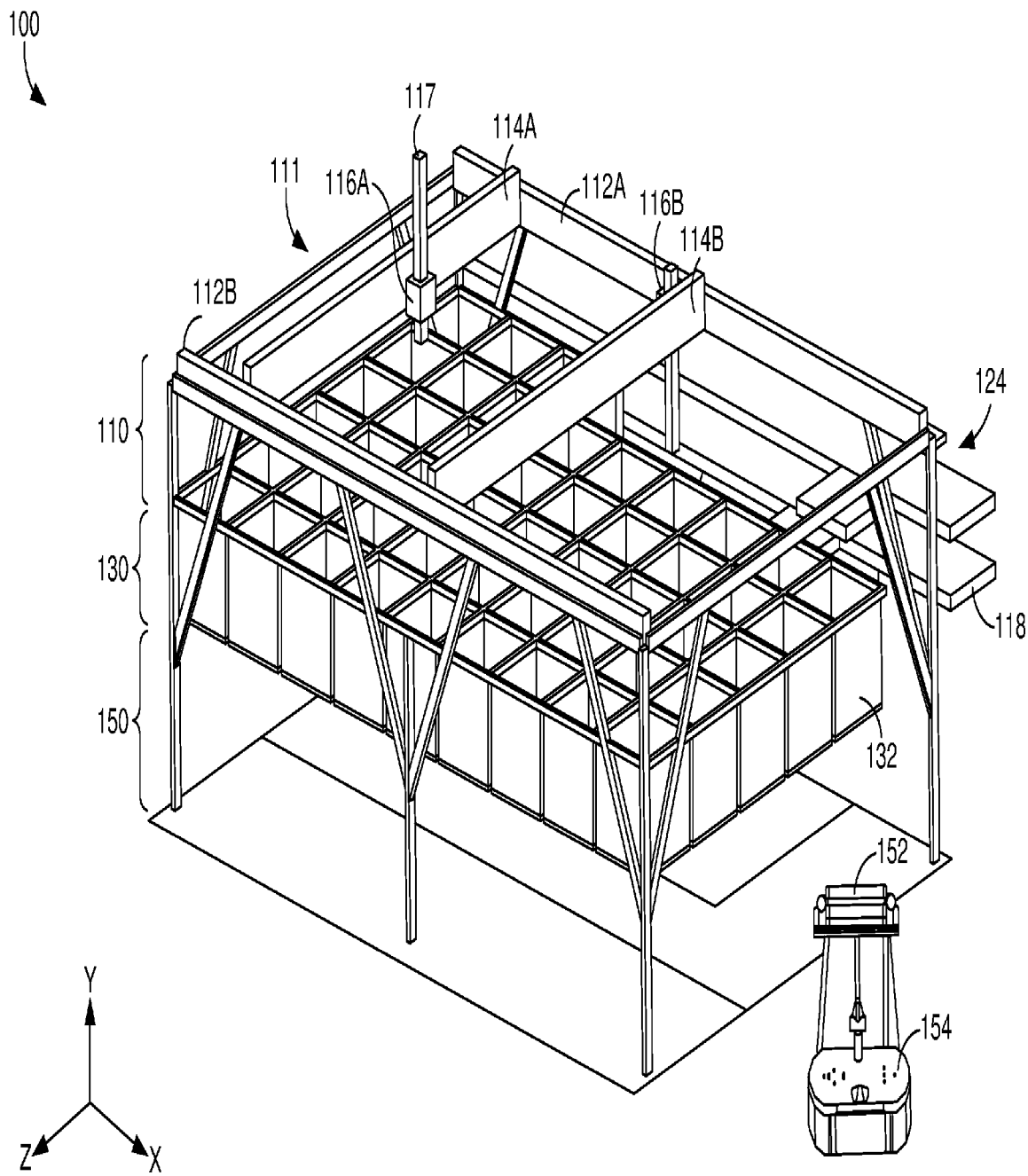
FIG. 1 depicts a perspective view of an example multi-tiered automated parcel sortation system in accordance with an aspect described herein.

Sorting parcels according to their assigned destination is a critical step for efficient delivery and supply management systems. While many aspects of parcel handling and transportation have become automated, sortation of parcels often involves precision in manipulating the parcels, particularly with parcels of a smaller size, which makes automation challenging. For this reason, many current methods of sorting parcels include manual sortation with some automated assistance. For example, in one current method, a human operator receives a parcel, scans the parcel to input a destination, and places the parcel within a storage area corresponding to the destination. The storage area is often a cubby within a vertical wall of cubbies. After the parcel is scanned, an indicator signaling the appropriate cubby may be given, such as the illumination of a light corresponding to the appropriate cubby, and the operator inserts the parcel into the cubby via a side opening. Once a cubby reaches a sufficient volume, another human operator moves the parcels within the cubby into a transportable container and places the container on a means of transportation, such as a conveyor belt, for transportation out of the sortation area for further processing.

Attempts to automate fully manual and semi-manual sortation methods have involved using an articulated robotic arm to receive the parcel and place the parcel within the assigned cubby. However, due to the kinematics of industrial arms, positioning the arm for placement of a parcel within a cubby along a vertical wall is inefficient. Additionally, robotic arms typically cannot finesse the positioning of parcels within the cubby to ensure maximum packaging. As a result, fewer parcels may fit within the cubby before the cubby needs to be emptied. As such, these attempts at automation have been inefficient in that they do not achieve the current throughput rates of the manual sortation systems. Additionally, in some instances, the use of robotic arms to sort parcels along a vertical wall requires more space than what is allotted for parcel sortation within existing infrastructure.

At a high level, aspects described herein relate to a multi-tiered automated parcel sortation system that is utilized to sort parcels according to a common destination. A first tier includes an automated sorter that is configured to transport parcels from a source location to a release destination. The first tier is positioned above a second tier that includes accumulation containers each associated with a shipping destination. When a parcel reaches the release destination within the first tier, it is released into an accumulation container within the second tier that corresponds to the parcel's shipping destination. Once the accumulation container has sufficient accumulation of parcels received from the first tier, the container is emptied as parcels are released into a third tier positioned below the second tier. The third tier includes a mechanism to transport the accumulation of parcels away for further processing and/or shipping to the next destination within the shipping route. This multi-tiered sortation system leverages gravity to maximize packing of parcels within an accumulation container and increase efficiencies within sortation.

In some embodiments, the first tier includes a plurality of tracks, and the automated sorter that transports the parcel within the first tier is an autonomous guided vehicle (AGV) that moves along the tracks with a parcel, which may be placed on a tray within or attached to the AGV body. The parcel may be dropped, slid, or otherwise released from the tray or AGV body when the AGV reaches the release destination on the tracks. In other embodiments, the first tier includes a grid of omnidirectional transfer units (OTUs) that transfer a parcel from one OTU to an adjacent OTU until the parcel reaches a release OTU, which is the OTU positioned above the corresponding accumulation container. Each OTU may have a detachable portion, such as a set of bomb-bay style doors, such that when the parcel is on the release OTU, a temporary opening may be created (for example, by opening the bomb-bay style doors) through which the parcel may be released into the accumulation container. This process may continue for multiple parcels. Note that all of the OTUs may be similar in their construction—e.g. the release OTU is constructed identically to all other OTUs in the first tier.

Once an accumulation container is filled with parcels having a shipping destination assigned to the container, the accumulation of parcels within that container is released to a third tier positioned directly below the second tier. One or more sensors may be used in determining whether the container is full. For example, a weight sensor may determine the weight of the accumulation of parcels within the container, and the accumulation may be released when an accumulation threshold is satisfied. Alternatively, a volume of parcels and/or height of parcels (which includes a distance of the parcels from the top of the container) may be utilized to determine whether an accumulation threshold is satisfied.

In the third tier, the parcels are transported away for further processing within the shipping network. The parcels may go on to additional processing within a storage or logistics facility or may go to a shipping truck to go to another destination within the parcels' shipping routes. In both cases, the parcels are transported from an area directly below the accumulation container to a perimeter of the sortation system or outside of the sortation system. The parcels may be transported within the third tier by a conveyor. In some aspects, the conveyor has a transport container that receives the parcels after they are released from the accumulation container, and in other aspects, the parcels are released directly onto the conveyor so that they may be transported as a grouping on the conveyor. In some aspects, the parcels are transported around the third tier by an autonomous guided vehicle that positions a transport container directly under the accumulation container and then transports the filled transport container once the parcels are received.

Figure 2:
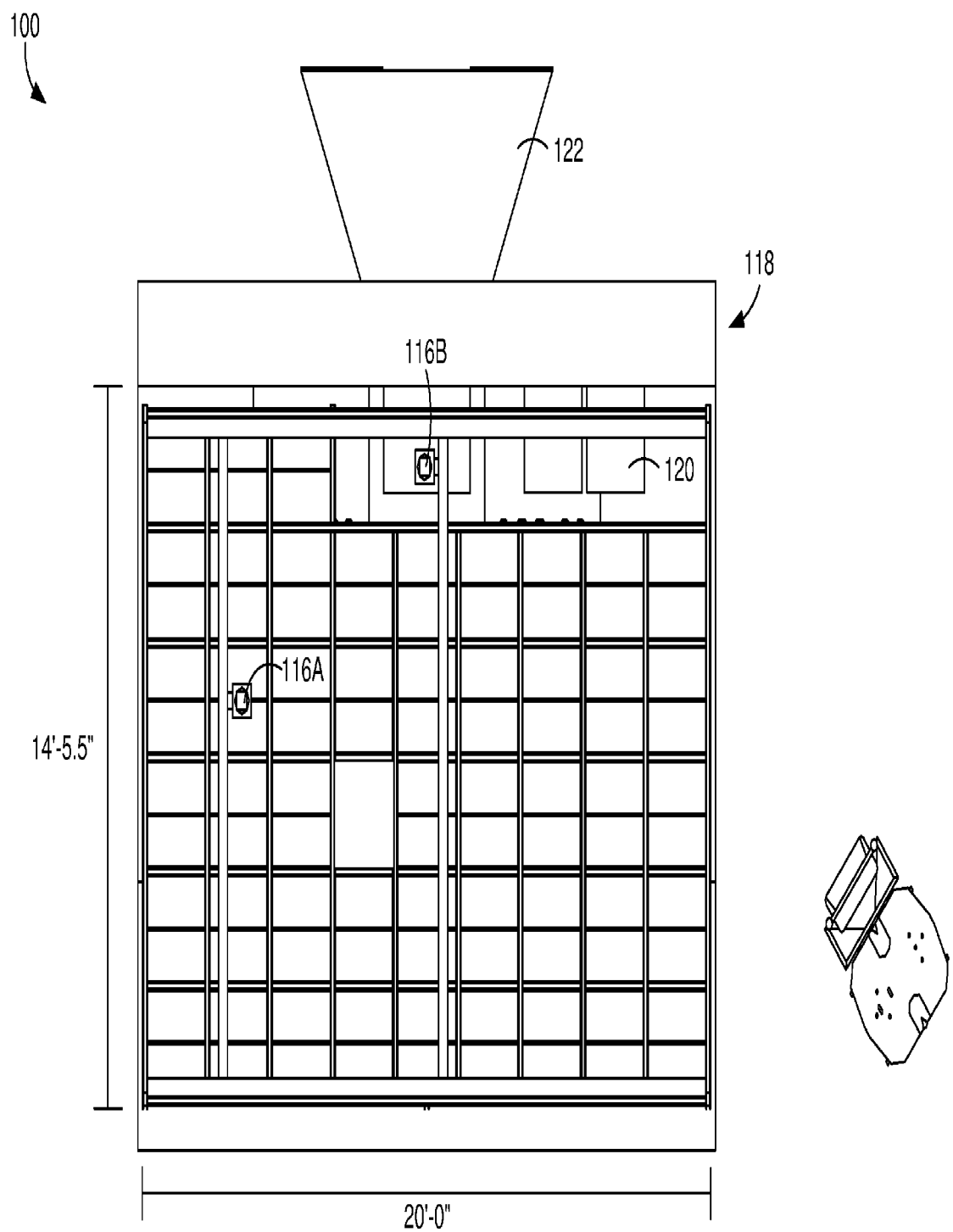
FIG. 2 depicts a top-down view of the example automated parcel sortation system of FIG. 1, in accordance with an aspect described herein.

Having described a high-level summary of the technology, example aspects are provided in further detail below with reference to the figures. Specifically, FIGS. 1 and 2 depict an example automated parcel sortation system 100 that is generally configured to physically group parcels according to a common destination. As used herein, a parcel may refer to a letter or package being sent to a designated recipient at a particular shipping destination (which may also be referred to a mailing destination). Automated parcel sortation system 100 is a multi-tiered, gravity-based sortation system in that it comprises multiple tiers that are oriented over one another along a vertical axis. Automated parcel sortation system 100 includes a first tier 110, a second tier 130, and a third tier 150. These tiers may also be referred to as a first zone, a second zone, and a third zone, or as a first stage, a second stage, and a third stage, respectively. Sorting a parcel in accordance with system 100 involves a parcel moving sequentially through tiers 110, 130, and 150.

In some embodiments, automated parcel sortation system 100 is utilized for sortation of a particular class of parcels designated as small parcels. For instance, parcels sorted through automated parcel sortation system 100 may have a maximum length of approximately 16 inches, a maximum width of approximately 16 inches, and a maximum height of approximately 6 inches. System 100 may also include minimum size requirements to ensure parcels of too small of a size are not overlooked or lost within the automated parcel sortation system 100. For example, parcels sorted through automated parcel sortation system 100 may have a minimum length of approximately 5 inches, a maximum width of approximately 3 inches, and a minimum height of approximately 0.04 inches. Further, in some embodiments, parcels sorted through automated parcel sortation system 100 have a minimum weight of approximately 0.05 lbs. and a maximum weight of approximately 8 lbs. Unless otherwise indicated, the term "approximately" as used herein with reference to physical measurements includes ±15% of the given value.

The first tier 110 is an automated sortation tier that is generally configured to transport parcels around along a horizontal plane (e.g., along x-axis and/or z-axis depicted in FIG. 1). The second tier 130 is an accumulation tier that is generally configured to receive parcels from the first tier 110 and temporarily store them as additional parcels accumulate within the second tier 130. The third tier 150 is a removal tier that is generally configured to transport accumulated parcels received from the second tier 130 out of the physical area housing the automated parcel sortation system 100 to proceed for further processing or shipment.

In the embodiment depicted in FIG. 1, the first tier 110 comprises a Cartesian robot system made up of a gantry 111 with one or more gantry heads that are moved within the framework of the gantry to drop off parcels into the second tier 130. The gantry 111 includes at least two static frames 112A and 112B extending parallel to one another and at least one moveable frame extending perpendicular to the two static frames. In FIG. 1, there are two moveable frames 114A and 114B, each having a gantry head (see gantry heads 116A and 116B) that are utilized to pick up and drop off parcels. In the example depicted in FIG. 1, the two moveable frames 114A and 114B are moveable along the x-axis. Each gantry head 116A and 116B is moveable along the respective moveable frame to move along the z-axis. It is understood that the static frames 112A and 112B and moveable frames 114A and 114B may be positioned different in other embodiments so that moveable frames 114A and 114B may be moveable along the z-axis while gantry heads 116A and 116B are moveable along the x-axis. Each gantry head, such as gantry head 116A, is configured to receive, transport, and release a parcel. Each gantry head may further include an element (e.g., 117 on gantry head 116A) that is moveable along the y-axis to enable vertical movement to retrieve and/or release a parcel. In this way, a parcel may be moved from one location to another location along the first tier 110 though movement along multiple static and moveable frames.

A gantry head (e.g., gantry head 116A) may receive or pick up a parcel from a source location along the perimeter of the gantry 111. Source location 124 in FIGS. 1 and 2 include conveyors. In another preferred embodiment, the source location may be a chute, such as chute 122 in FIG. 2. For instance, FIG. 1 depicts source location 124 outside of static frame 112A. Source location 124 is depicted as being along one side of the perimeter of first tier 110; however, in other embodiments, a source location may be within a central region of first tier 110. A centralized source location could minimize the average distance from induction (receipt of the parcel at the source location) to the release destination. For example, an elevator or augur mechanism may lift parcels up to the center of the gantry 111 in first tier 110, and dump them into a bulk pile, while a gantry head could then pick up a parcel from this pile.

In some embodiments, there may be one or more source locations. Generally, more source locations allow for more automated sorters (e.g., gantry heads) to be moving at the same time to pick up and/or drop off parcels. As such, utilizing more source locations may increase the efficiency of the system. At the same time, the efficient use of more source locations may depend on mechanisms to synchronize multiple automated sorters to avoid collisions and blockages as described further below.

Figure 3:
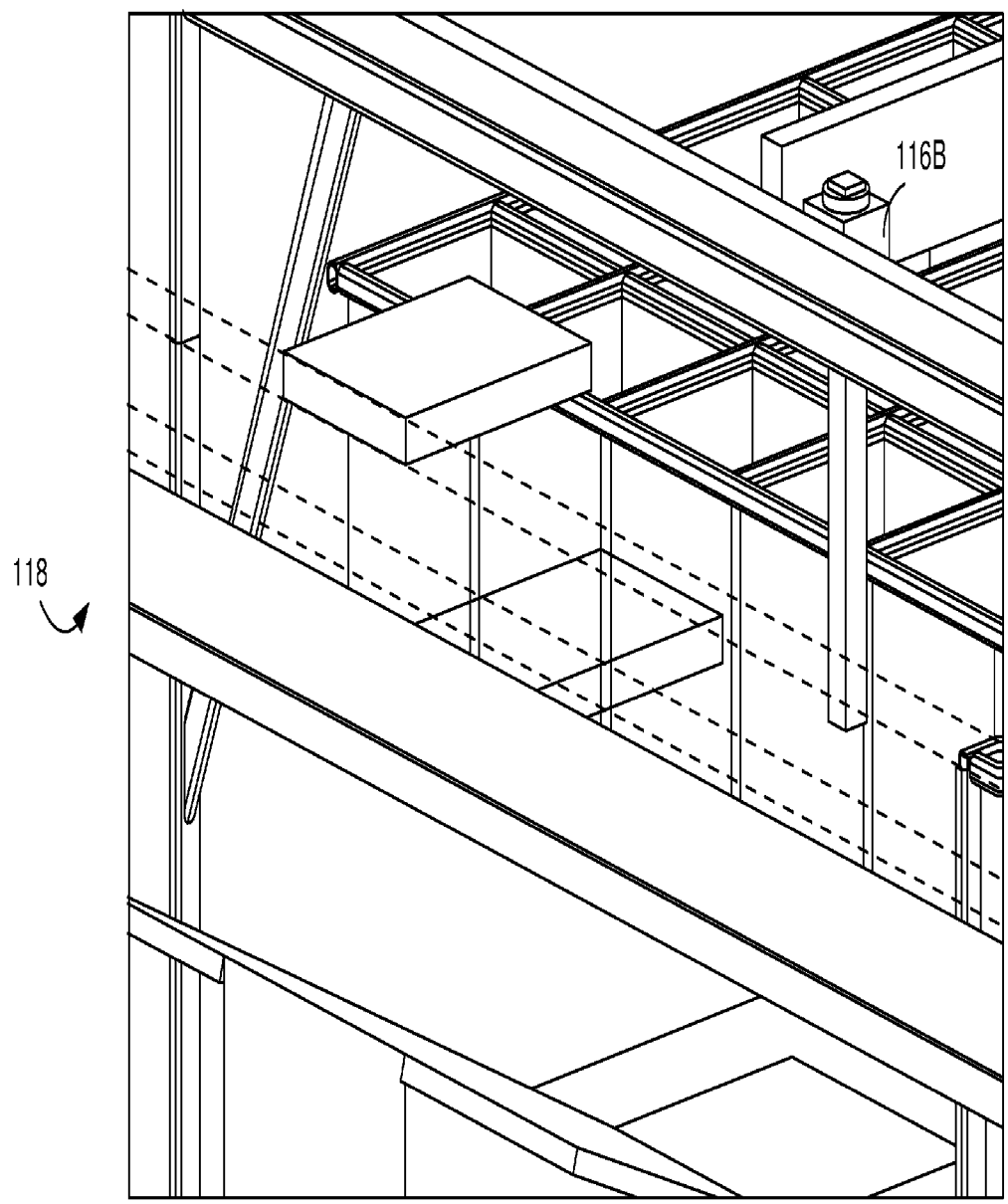
FIG. 3 depicts a close-up view of a source location within the example automated parcel sortation system of FIG. 1, in accordance with an aspect described herein.
Figure 4:
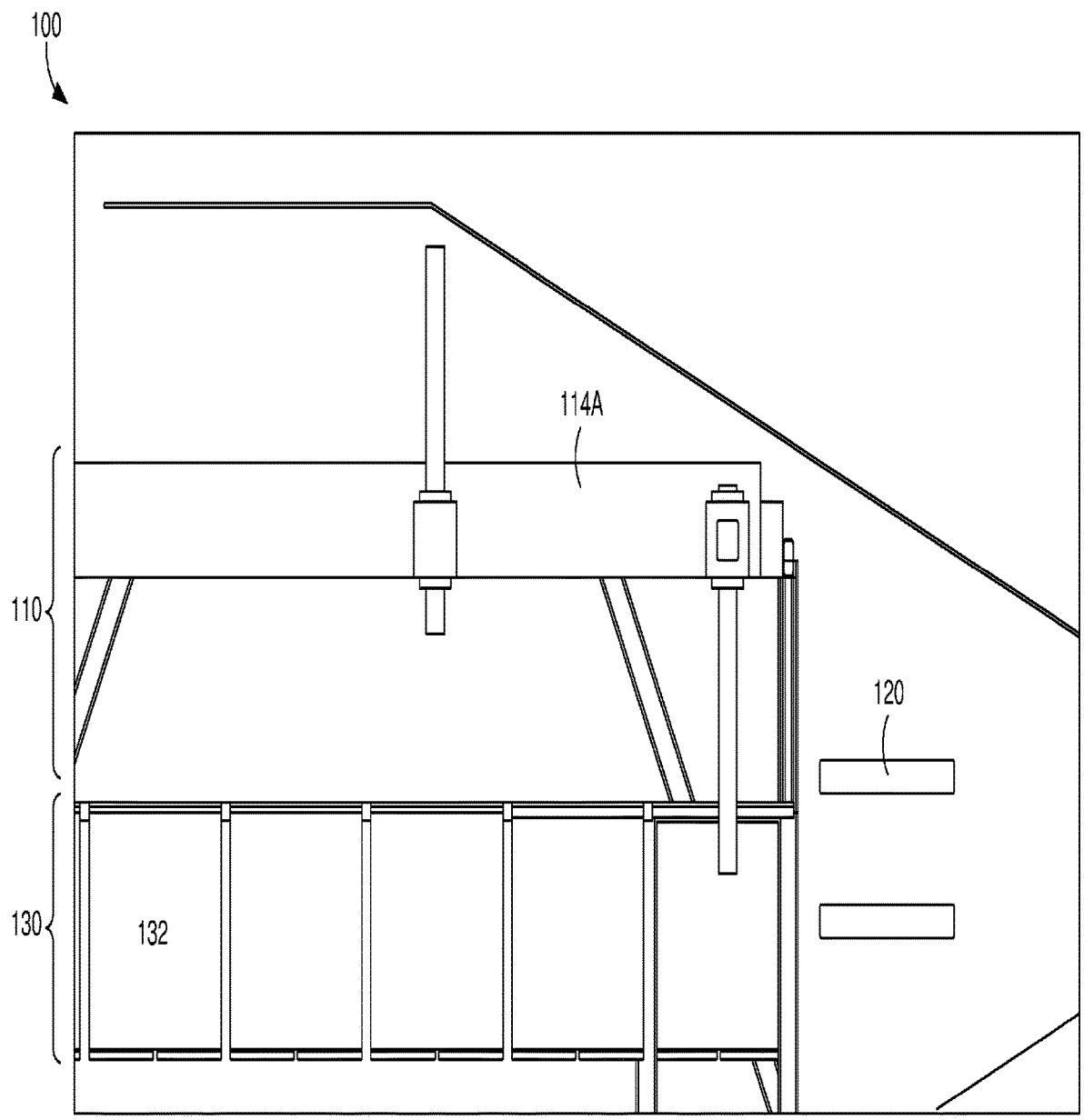
FIG. 4 depicts a portion of the first and second tiers of the example automated parcel sortation system of FIG. 1, in accordance with an aspect described herein.

The gantry head 116A may pick up a parcel from a source location, such as conveyor 118, at the source location 124. In one aspect, the gantry head 116A comprises a robotic manipulator that can be automatically adjusted to pick up a parcel from a pile of parcels at the source location. In other aspects, the gantry head 116A picks up a singulated parcel that is spaced apart from other parcels. The singulated parcel may be picked up from conveyor 118 or may be picked up on a shorter lateral belt 120 or chute coming off conveyor. FIGS. 3 and 4 depict other views of conveyor 118 and lateral belt 120. In some aspects, a lateral belt or chute is alternatively or additionally provided to divert parcels into an exception area or for sortation by a separate system.

Prior to being received by an automated sorter in first tier 110, such as gantry head 116A, a parcel may be scanned so that the automated parcel sortation system 100 can determine an intended shipping destination assigned to the parcel. As used herein, the term "shipping destination" may be the final destination intended by the recipient or may be an intermediary destination within the shipping network. As such, in some embodiments, one or more cameras or other optical sensors may be utilized to scan a parcel as it is lifted from into place, such as when it is picked up by gantry head 116A. In other aspects, the parcel may be scanned while on a conveyor or lateral belt prior to being picked up. In some embodiments, a radio frequency identification scanner is used to scan the parcel in addition to or instead of a light camera or other optical sensor.

The second tier 130 of automated parcel sortation system 100 comprises a plurality of containers 132, referred to herein as accumulation containers. In some aspects, each the accumulation container 132 has an opening at a top end and a door forming a lower end. The accumulation containers 132 may be of an identical size and shape. In one aspect, the accumulation containers 132 are square containers measuring approximately 24 inches wide, approximately 24 inches deep, and approximately 24 inches tall. As illustrated, the accumulation containers 132 may be arranged to form a grid of containers directly below the first tier 110.

Each accumulation container 132 is associated with a destination or group of destinations. As such, each parcel can be sorted into a particular accumulation container 132 that corresponds to the shipping destination determined for the parcel. In some embodiments, each accumulation container 132 is associated with a unique destination or unique group of destinations such that there may be no destination or group of destinations shared among different accumulation containers 132. In other embodiments, there may be multiple accumulation containers 132 associated with the same destination (or group of destinations). In both cases, the accumulation containers 132 within second tier 130 may not all be associated with the same destination such that multiple destinations are represented by the accumulation containers 132. In some embodiments, the destination assigned to a specific accumulation container may be changed dynamically during sortation. In one example case, changing destination assignments of accumulation containers 132 may be done by reassigning destinations associated with a high volume of parcels being sorted to accumulation containers that are closer to the source location, thereby reducing the time that the sortation system 100 spends in motion. In a second example case, this reassignment may be done to support a sudden surge in volume being sorted to that destination by increasing the number of accumulation containers assigned to a specific destination.

When a parcel is scanned, it will be assigned an accumulation container 132 based on the intended destination determined from the scan. The automated sorter within the first tier 110, such as gantry head 116A, will receive the parcel from the source location 124 and move along one or more of the z-axis, the y-axis and the x-axis to position the parcel directly above the assigned accumulation container 132. Transporting the parcel from the source location 124 to a position above the assigned accumulation container 132 includes determining a route. The route may be determined by a remote computing device, and directions for an automated sorter (e.g., gantry head 116A) to achieve the route may be sent to one or more computing systems or receivers integrated into a physical structure of the automated sorter (e.g., gantry head 116A) and/or physical structure of the first tier 110 (e.g., gantry 111). Alternatively, the route may be determined by a computing system integrated into the physical structure of the automated sorter or first tier 110.

Once a parcel is positioned over its assigned accumulation container 132, the automated sorter within the first tier 110, such as gantry head 116A, may release the parcel, causing the parcel to drop into the opening at the top of the accumulation container 132. In exemplary aspects, one or more steps are taken to ensure adequate parcel care as a parcel is dropped into an accumulation container 132. For example, in some aspects, the automated sorter, such as the gantry head 116A may lower the parcel into the accumulation container 132 and, in some instances, may lower the parcel into the accumulation container 132 at a decreasing speed or at a slower speed relative to the speed at which the gantry head 116A traverses the first tier 110. Additionally or alternatively, each accumulation container 132 may be lined with a cushioning material, such as a textile or foam material for example, to reduce impact. Additionally or alternatively, all or part of each accumulation container 132 may be lined with material designed to slow the fall of the parcel, such as stiff plastic brushes. Additionally or alternatively, the accumulation containers 132 may be partially or fully constructed from a flexible and/or elastomeric material. Additionally or alternatively, each accumulation container 132 may be suspended from a shock-absorbing element, such as coil springs for example.

After a parcel is released into the second tier 130, the automated sorter (e.g., gantry head 116A) may move back to the source location 124 to retrieve an additional parcel to place in the same accumulation container or in another accumulation container based on the intended destination. Arranging the automated sorter above the accumulation containers, rather than the sorter being aligned horizontally with a storage component, leverages gravitational forces to cause the parcel to move from the automated sorter (e.g., to the accumulation container 132 below, thereby reducing the amount of work required by the automated sorter (e.g., gantry head 116A). The automated sorter, such as gantry head 116A, may immediately begin traveling back to the source location for another parcel as soon as the parcel is released.

Each accumulation container 132 may be designed to ensure that parcels will successfully fall into the accumulation container, or to fit multiple parcels. For instance, as previously mentioned, there may be a maximum parcel size for the automated parcel sortation system 100, and in some embodiments, each accumulation container is sized to ensure that the largest parcel that may be sorted will fit into the accumulation container opening, regardless of orientation. For example, in some embodiments, the maximum parcel length is 16 inches, the maximum parcel width is 16 inches, and the maximum parcel height is 6 inches. In these embodiments, the accumulation container opening may be 24 inches by 24 inches such that regardless of its orientation when dropped, the parcel will fit through the accumulation container opening. Similarly, the accumulation container may be sized to fit some desired number of parcels of the maximum size.

Fitting more parcels within a single accumulation container to collectively transport to the next tier at one time generally increases the efficiency of the sortation system. Because the parcels being sorted may be different sizes and shapes, the manner in which a parcel sits within an accumulation container may determine how many parcels will fit. Generally, by placing parcels through an opening at the top of the container, the parcels move vertically through the container and gravitational forces help to settle the parcels to reduce empty space between parcels. As such, this vertical arrangement of the first tier 110 and the second tier 130 helps pack parcels within the accumulation container 132 for efficient sorting without manipulation within the container by robotic arms.

After a parcel is placed within the accumulation container 132, the parcel may be temporarily stored within the accumulation container 132 as more parcels are moved from the source location and added to the accumulation container 132. Once the accumulation container 132 is filled, as determined by an accumulation threshold value, the parcels stored within the accumulation container may be released to third tier 150. In some aspects, there are one or more sensors obtaining data for a fill or accumulation measurement of each accumulation container 132. For example, a weight sensor within the accumulation container 132 may provide a total weight of parcels within accumulation container 132, and/or an imaging sensor at the top of an accumulation container 132 or positioned above the accumulation container 132 (such as within a component of the first tier 110), may provide images of the interior of the accumulation container 132 to determine the total volume of parcels within the accumulation container 132. In another embodiment, a distance sensor, such as an ultrasonic rangefinder or laser distance sensor, is utilized to measure the top-most position of the parcels with the accumulation container 132. As such, automated parcel sortation system 100 may compare these one or more of these measurements to a respective accumulation threshold value (e.g., a threshold weight, threshold volume, threshold distance) to determine whether there is sufficient accumulation or fill with the accumulation container 132. This information from the sensors may be captured periodically or continuously and may be captured automatically in real time. In some embodiments, sensors within the automated parcel sortation system 100 are not utilized to determine a threshold accumulation, but rather, the known volume and/or weight of the parcels (as determined prior to sortation) may be input into one or more models run on a computing system to determine when the accumulation container 132 is full. In some embodiments, the accumulation threshold is a measure of time such that an accumulation container 132 may be determined to be full if a threshold period of time has passed since it was last emptied.

Once the accumulation threshold is satisfied (e.g., meets or exceeds the threshold value), one or more actions may be automatically initiated to release the accumulation of parcels into third tier 150 which comprises an area through which the accumulation of parcels are automatically transported to the perimeter of or outside of the area of the automated parcel sortation system 100. In exemplary embodiments, one of these actions includes automatically opening a door forming the bottom surface of the filled accumulation container 132. Opening the door creates an opening through which the accumulated parcels can travel to enter the third tier 150.

In one embodiment, the door of the accumulation container 132 is a "bomb-bay style" door. As such, the bottom portion of the accumulation container 132 may include a first half forming a first door and a second half forming a second door. Each door may be secured to another portion of the accumulation container 132 (e.g., the sidewall or a perimeter non-moveable portion of a bottom wall) along one side of the door but may be otherwise unattached along the other three sides of the door. Each door may be connected to the rest of accumulation container 132 via a hinge such that each door is configured to pivot around the hinge to open and release the accumulated parcels.

In another embodiment, the bottom portion of the accumulation container 132 comprise a "rolling door" constructed of panels of rigid material joined together so as to form a sheet that is rigid in two directions but flexible in the perpendicular direction. For instance, the sheet of panels may be rigid about the x-axis and y-axis and flexible along the z-axis, or alternatively, the sheet of panels may be rigid about the y-axis and the z-axis and flexible along the x-axis. In this way, the door may be made to roll over itself towards a side of the accumulation container 132 to create an opening in the bottom of the accumulation container 132. In some embodiments, the panels forming the door may be linked in an accordion fashion such that the panels fold up, rather than roll, when they are moved to the side of the accumulation container 132.

In another embodiment, the bottom portion of the accumulation container 132 opens and closes utilizing a "flexible iris-style mechanism". As such, the door may comprise a first plate and a second plate that each has an aperture, the first plate and the second plate being parallel to each other and arranged to at least partially overlap each other so that the apertures of the first and second plates are vertically aligned. The first and second parallel plates may be connected along their respective perimeter by a flexible material. At least one of the parallel plates may be rotated relative to the other plate to open and close an opening of the accumulation container 132. When open, a tunnel is formed between the apertures of the first and second plates, and parcels may drop through the tunnel into the third tier 150. When rotated closed, the flexible material becomes twisted and gathers in the center such that the flexible material is positioned between the apertures of the first and second plates, thereby preventing an opening from forming and keeping parcels within the accumulation container 132. In another embodiment, a more rigid "iris-style mechanism" may be utilized in which a plurality of overlapping plates rotate relative to a base plate to contract and expand the opening between base plate and set of overlapping plates.

In another embodiment, the bottom portion of the accumulation container 132 comprises one or more sliding doors. For instance, in FIGS. 5A-B, the bottom portion of accumulation container 132 includes a first door 134A and a second door 134B that are each connected to one or more actuators (in this example, pneumatic cylinders) 136 oriented horizontally. It is contemplated that the doors may be connected to a pair of cylinders but only one cylinder is visible in the side view depicted in FIGS. 5A-B. The pair of actuators 136 may each rotate about or translate along one axis to push the doors 134A and 134B downward and may extend along another axis to push the doors 134A and 134B outwards (sideways along a horizontal plane). In this way, the doors 134A and 134B slide partially under adjacent accumulation containers to create an opening at the bottom of the accumulation container 132 to be emptied.

Figure 5A:
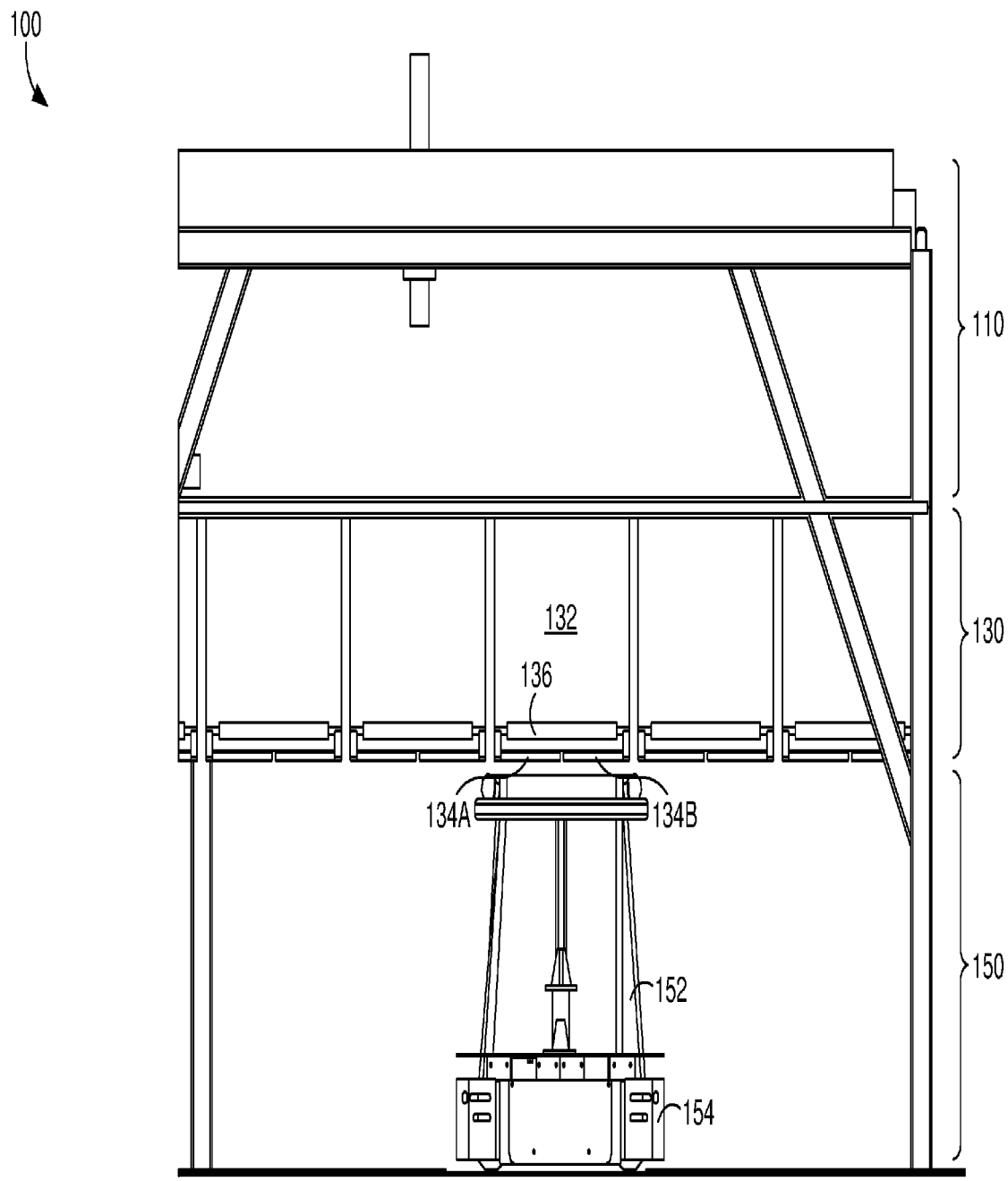
FIG. 5A depicts a portion of the first, second, and third tiers of the example automated parcel sortation system of FIG. 1, in accordance with an aspect described herein.

When the bottom door(s) of the accumulation container 132 opens to release the parcels, the parcels enter into the third tier 150 for transport to further processing area, which may ultimately include transport to the shipping destination. As shown in FIG. 5A, in exemplary aspects, the parcels from the accumulation container 132 are released into a transport container 152 positioned within the third tier 150 directly below the accumulation container 132 that is releasing the parcels. In some embodiments, the transport container 152 has a volume that is equivalent or substantially equivalent to the volume of the accumulation container 132. In some aspects, the transport container 152 may comprise a more flexible material than the accumulation container 132. For instance, in some aspects, the transport container 152 comprises a mesh bag. While accumulation containers 132 may be a static fixture within system 100 in that they are not moved with parcels, some embodiments of transport containers 152 are moveable in that the transport containers 152 can leave the area housing the sortation system 100 with the parcels or otherwise move parcels towards the perimeter of or an area outside the sortation system 100.

Because keeping transport containers 152 under each accumulation container 132 as the parcels are accumulated would likely block movement of the transport containers 152 out of the third tier 150 once parcels are received, the transport container 152 may be positioned underneath an accumulation container 132 only once the accumulation threshold is satisfied. As such, in some embodiments, satisfying the accumulation threshold initiates a signal being sent to an autonomous guided vehicle (AGV) 154 (which may also be referred to as a transport AGV 154) to carry an open transport container 152 to a position within the third tier 150 directly below the accumulation container 132 that has been filled. In alternative embodiments, a different threshold value may be utilized to initiate a signal for triggering positioning of an open transport container 152 within the third tier 150. Specifically, as the accumulation threshold previously discussed may be used to trigger release of parcels from the accumulation container 132, a different (i.e., lower) accumulation threshold value may be used to signal an action (e.g., movement of an AGV) to position an open transport container 152 under the accumulation container 132 prior to release of the parcels from accumulation container 132.

Once the threshold is satisfied, the AGV 154 may travel into the area of the third tier 150 along one of a plurality of fixed routes until it is positioned under the accumulation container 132. In some embodiments, an autonomous mobile robot (AMR) is utilized instead of an AGV to carry the transport container 152 through the third their 150 until it is positioned underneath the accumulation container 132. The AMR may provide more flexibility as it does not have to travel along a fixed route. Once the transport container 152 has received the parcels from the accumulation container 132, the transport container 152 may be transported, via the AMR or AGV for example, outside of the third tier 150 or outside of the automated parcel sortation system 100 as the parcels in the transport container 152 are ready to be sent to their next destination.

In some embodiments, the accumulated parcels from an accumulation container 132 are not put into a transport container, such as transport container 152 depicted in FIG. 1, before being carried out of the third tier 150. For instance, in alternative embodiments, the accumulated parcels are released from the accumulation container 132 onto a platform on an AGV or AMR, which then transports the grouping or clump of parcels to the perimeter of or outside of the sorting area for further processing. In another embodiment, the accumulated parcels may be transported on a rack-mounted flexible tote system once they are released from the accumulation container 132.

Implementing a process for bagging or otherwise transporting an accumulation of parcels (third tier 150) underneath the automated sorter (first tier 110) and accumulation containers (second tier 130) reduces the footprint of the complete automated parcel sortation system 100. The footprint of system 100 may, thus, be defined by the number of destinations the system 100 is required to service and the minimum accumulation container size that can reliably accommodate the largest possible parcel in sortation. In exemplary embodiments, the size of the system 100 (not including any secondary conveyors such as conveyors transporting parcels to a source location) is able to fit within a cell that is 20 feet wide and 14 feet and 5.5 inches deep, as shown in FIG. 2. In some embodiments, the size of the system 100 may fit within a cell previously utilized for manual sortation such that the automated parcel sortation system 100 may be more efficiently implemented within existing sortation infrastructure.

As discussed earlier, utilizing gravity-based sortation increases the speed of sorting, provides more efficient and natural container-packing behavior, and simplifies parcel manipulation tasks. Further, embodiments of the automated parcel sortation system 100 are highly adaptable as they do not depend on a particular technology. For example, different technologies can be utilized for the sorter (first tier 110), accumulation container (second tier 130) and bagging/transport (third tier 150), depending on the requirements of a specific environment. FIGS. 6-10, for instance, depict alternative technologies being utilized that still utilize many aspects of system 100 discussed above. These alternative technologies may have the same and, in some cases, additional advantages as system 100.

Figure 6:
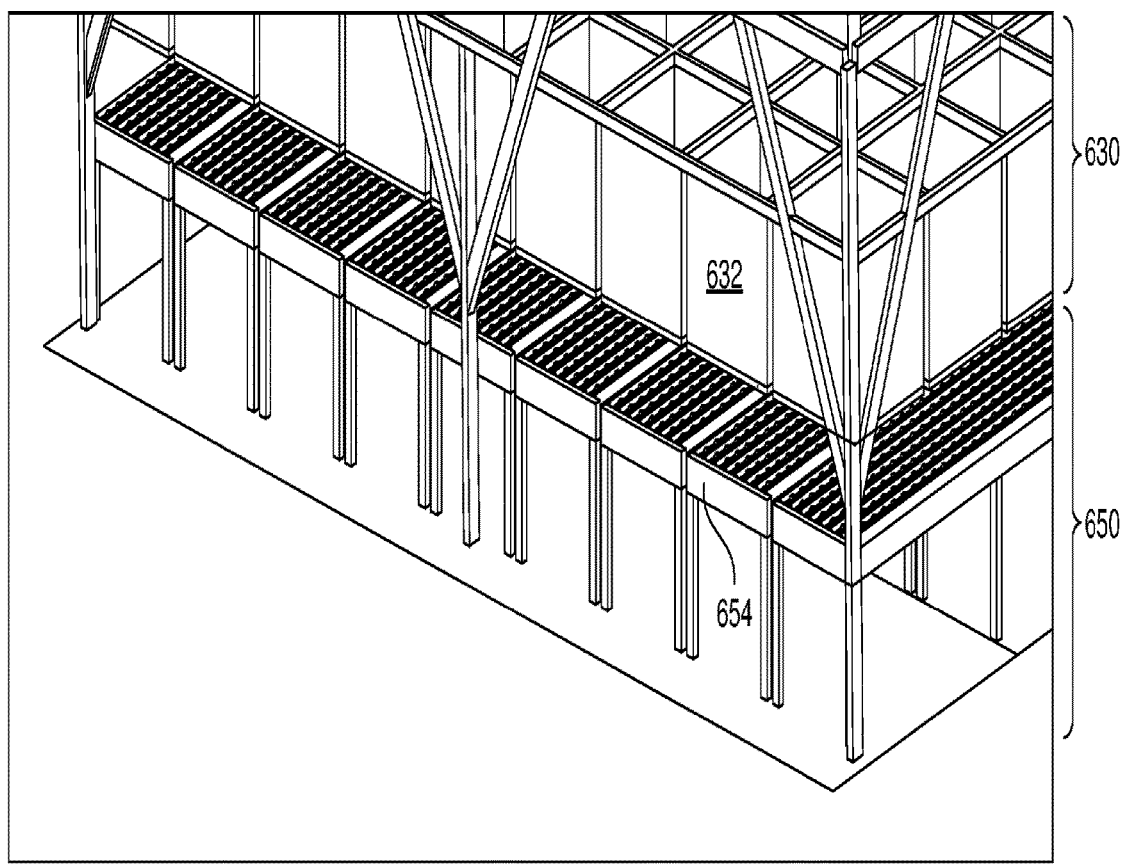
FIG. 6 depicts a portion of an alternative example transport tier of a multi-tiered automated parcel sortation system in accordance with an aspect described herein.

In an alternative embodiment depicted in FIG. 6, an automated parcel sortation system 600 may have the same configuration as automated parcel sortation system 100 except has an alternative configuration for the third tier. For instance, the third tier 650 comprises a series of conveyors 654 extending the length of the third tier 650 area. Automated parcel sortation system 600 may have a first tier that is the same configuration as first tier 110 of system 100, and the second tier 630 may have accumulation containers 632 that are the same configuration as described for second tier 130. Parcels may be released from accumulation container 632 upon satisfying an accumulation threshold, and the released parcels be dropped onto a conveyor 654, which may be a conveyor belt, that transports the accumulation of parcels away.

In some embodiments, parcels are released from accumulation container 632 into a transport container (which may be similar as transport container 152 in FIG. 1) positioned on conveyor 654 on the third tier 650. In this way, the accumulation of parcels may be transported within the third tier 650 in a container rather than as an uncontained grouping or pile of parcels. In some embodiments, the transport container is not moved via conveyor 654 to be positioned underneath an accumulation container 632 until the accumulation container 632 is ready or near ready to release the parcels. For instance, satisfying a first accumulation threshold may signal the conveyor 654 to move and/or for a transport container to be positioned on a moving conveyor 654. A second accumulation threshold may be used to signal release of the parcels from the accumulation container 532, where the second accumulation threshold may be greater than the first accumulation threshold such that the first accumulation threshold will always be satisfied before the second accumulation threshold. In some embodiments, an accumulation threshold is used to initiate positioning of a transport container beneath a particular accumulation container 532 while release of the parcels from the accumulation container 532 may be initiated based pre-determined time period having lapsed since initiating the accumulation threshold.

Figure 7:
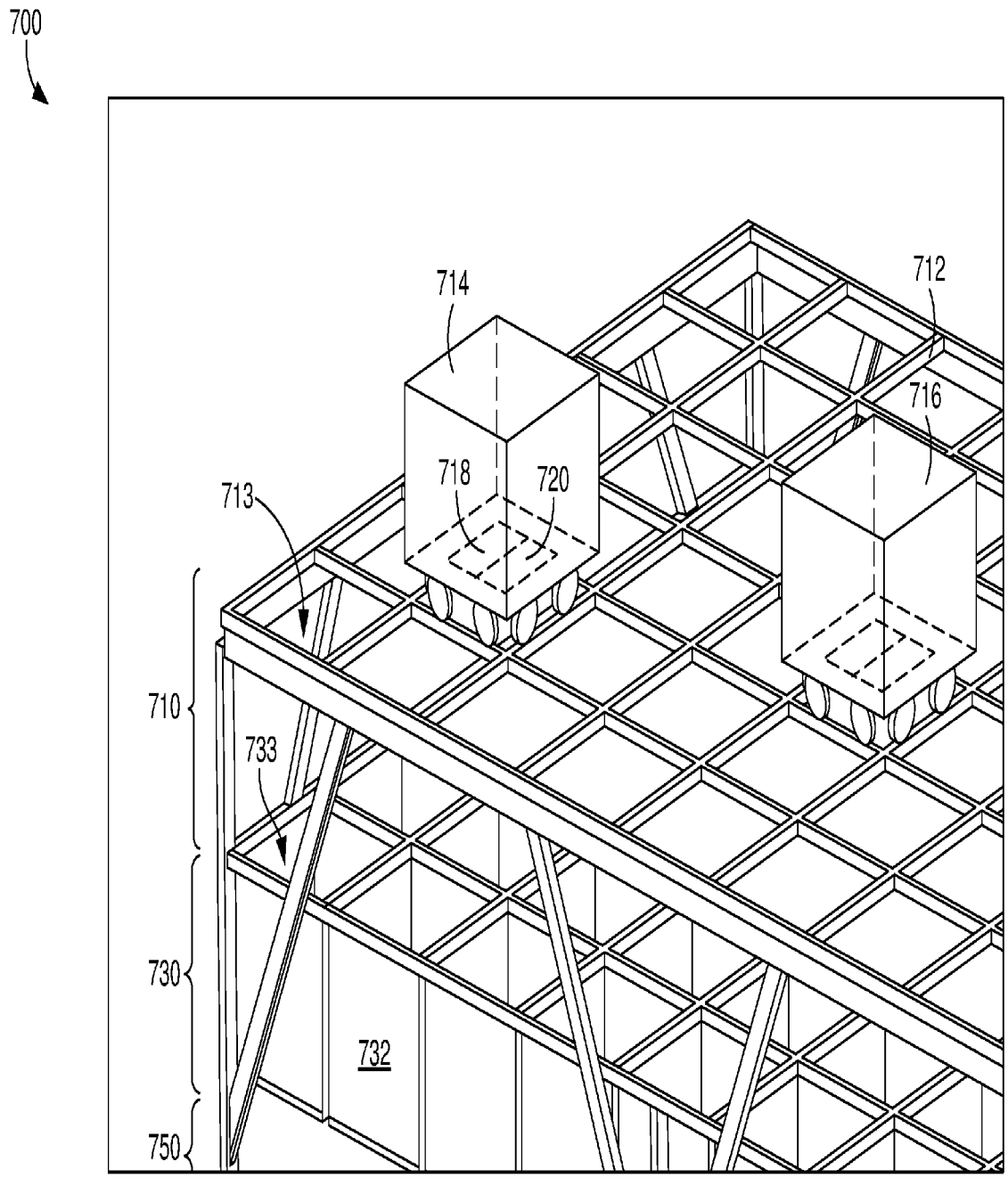
FIG. 7 depicts a portion of an example automated parcel sorter for a first tier of a multi-tiered automated parcel sortation system in accordance with an aspect described herein.

FIG. 7 depicts an alternative mechanism for transporting parcels from a source location to be positioned over the assigned accumulation container within the first tier. Rather than utilizing a Cartesian robotic system with one or more gantry heads, the automated sorter within a first tier 710 comprises one or more autonomous guided vehicles (AGVs), such as AGVs 714 and 716 (which may also be referred to as sortation AGVs 714 and 716 to distinguish from transport AGVs 154). The first tier 710 also includes a plurality of tracks 712 that intersect with one another to form a grid positioned above the accumulation containers 732 of the second tier 730. There are openings (e.g., opening 713) between tracks 712, and the tracks 712 may be vertically aligned with an area between two adjacent accumulation containers 732 or the area where two adjacent accumulation containers 732 coincide. In this way, each opening 713 created between intersecting tracks 721 may align with a top opening (e.g., top opening 733) of an accumulation container 732.

One or more AGVs 714 and 716 may move along pairs of tracks 712 to transport a parcel from a source location to an opening (e.g., opening 713) directly above the particular accumulation container 732 assigned to the parcel. In example embodiments, each AGV includes a body, a set of wheels secured to the body and configured to traverse tracks along different axes, a route component configured to determine one or more routes along the grid, and an automated steering component configured to steer the AGV according to the route. Similar to the Cartesian robotic system of FIG. 1, AGVs 714 and 716 are automatic parcel sorters in that they automatically transport parcels around the first tier 710 without manual input.

The bodies of the AGVs 714 and 716 may each include a tray forming a platform for holding a parcel being transported. The tray may be generally oriented horizontally or parallel to the grid. The tray may form a lower portion or floor of the body of the AGV. The body may also include a tray opening mechanism configured to move the tray when the automated sorter is positioned at a predetermined release destination above an accumulation container 732.

Similar to the door at the bottom of an accumulation container 732 (which may be similar to accumulation container 132), the tray and tray opening mechanism function to provide a temporary floor for a parcel that can be removed to create an opening through which the parcel drops downward. In this way, the structural mechanisms described with respect to the door of the accumulation container 132 may be applied to the tray within the AGV 714. As such, in one embodiment, the tray comprises a pair of doors that are coupled to the body of the AGV 714. FIG. 7 depicts these doors 718 and 720 in dashed lines. Each door may function as a "bomb-bay style" door such that the doors are configured to each rotate along a hinge coupling the door to the body of the AGV 714. As the doors pivot around the hinges, an opening in the bottom of the AGV 714 is created and the parcel may be released. In some embodiments, the tray comprises a single door that is coupled, via a hinge, to the body of AGV 714.

In another embodiment, the bottom portion of the AGV 714 comprises a "rolling door" type of tray that is constructed of panels of rigid material joined together so as to form a sheet that is rigid in two directions but flexible in the perpendicular direction (e.g., rigid about the x-axis and y-axis and flexible about the z-axis or rigid about the y-axis and z-axis and flexible about the x-axis). The tray may be made to roll over itself as it is forced sideways to create an opening in the bottom of the AGV 714. In some embodiments, the panels forming the tray may be linked in an accordion fashion such that the panels fold up, rather than roll, when they are forced to the side.

In another embodiment, the bottom portion of the AGV 714 opens and closes utilizing an "iris-style mechanism". As such, the tray holding the parcel may comprise a first plate positioned over a second plate. The first plate and the second plate each may have an aperture where the apertures may be vertically aligned with one another. The first and second parallel plates may be connected along their respective perimeter by a flexible material. At least one of the parallel plates is rotated relative to the other plate to open and close the tray of the AGV. When in an open configuration, a tunnel is formed between the apertures of the first and second plates, and a parcel may drop through the tunnel into an accumulation container 732. When in a closed configuration, the flexible material is twisted and gathered in the center such that the flexible material is positioned between the apertures of the first and second plates, thereby preventing an opening from forming.

Figure 5B:
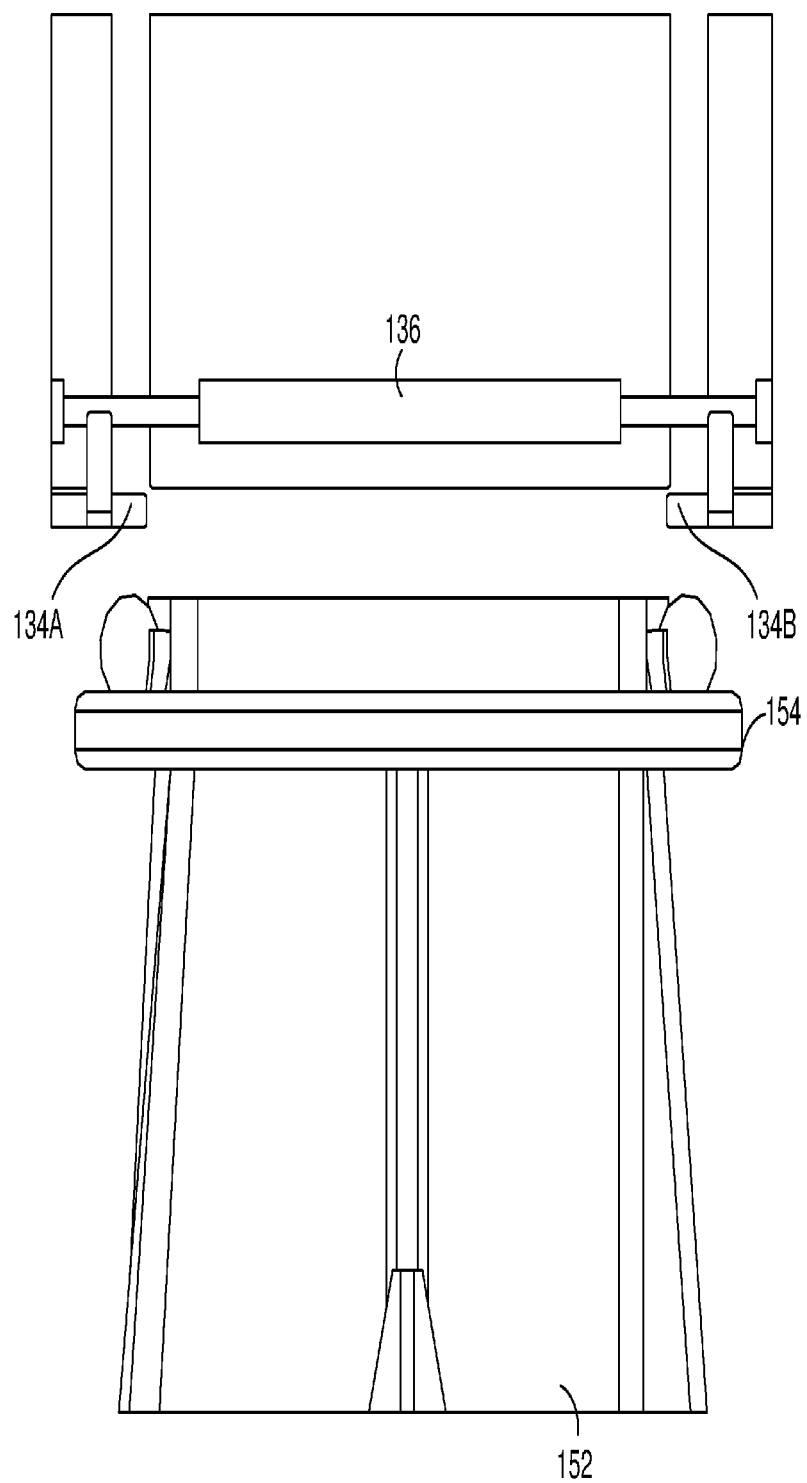
FIG. 5B depicts a portion of a transport container positioned below an accumulation container within the example automated parcel sortation system of FIG. 1, in accordance with an aspect described herein.

In another embodiment, the bottom portion of the AGV 714 comprises one or more sliding trays, similar to the doors of accumulation container 132 discussed with reference to FIGS. 5A-B. For example, a first tray and a second tray may each be connected to one or more pneumatic cylinders oriented horizontally. The cylinders may each rotate about or translate along one axis to push the trays downward and may extend along another axis to push the trays outwards (sideways along a horizontal plane). The trays may be pushed downward only at enough distance to slide between the body of the AGV 714 and top of the tracks 712. Alternatively, the trays may be slid down below the tracks 712 before being slid outwards.

Before being transported across the grid and released into an accumulation container 732, a parcel is first loaded onto the tray in the body of the AGV 714. The parcel may be loaded on at a source location similar to the source location 124 discussed with respect to system 100. In some embodiments, a parcel is placed on the tray through a singulation mechanism. For example, parcels may be spaced apart along a conveyor that dumps a single parcel on the tray. In another instance, the parcels may be arranged in a pile, and a small robotic arm may pick up a parcel from the pile and place it on the tray. In this instance, the robotic arm may also perform a scanning function on the parcel as it picks it up and places it on the tray, using one or more of the methods described previously.

In some embodiments, the tray is accessible through one or more side walls of the AGV 714. The side wall(s) may be permanently open or may have a removable cover. For instance, one side wall of the AGV 714 body may have an opening or may be omitted completely to provide access to a tray in the center of the AGV body. In one example, the top side of the AGV body may be omitted or includes an opening through which a parcel is placed. In some embodiments, a cover may be removed while a parcel is placed onto the tray and put back on to prevent the parcel from falling out of the AGV 714 while being transported to the release destination.

After a parcel is loaded onto the tray in the AGV 714, the AGV 714 traverses the grid to reach the release destination, which is the opening (e.g., opening 713) positioned over the particular accumulation container 732 corresponding to the shipping destination of the parcel. As such, the AGV 714 determines a route from the source location to the release destination. The route may be determined by applying an algorithm or one or more machine learning models to automatically determine a route with the shortest distance between the two locations while avoiding any blockages, such as other AGVs or broken or otherwise inoperable track portions. As such, the route may be based on the release destination and the current (or future) positions of any other AGVs on the grid (which may be based on current and future routes of other AGVs). This route may be determined using the algorithm or machine learning model by a remote computer system, and the route component on the AGV 714 may be a receiver that receives a signal indicating the determined route as described with respect to FIG. 11. In other embodiments, a computing system integrated into the AGV 714 computes the route using the algorithm or machine learning model(s).

Once at the release destination above the assigned accumulation container 732, the AGV 714 stops, and the tray of the AGV 714 opens to drop the parcel in to the accumulation container 732 in one of the manners described previously. After the parcel is dropped into the accumulation container 732, the AGV 714 may return to a source location. As such, the route component of the AGV 714 may also determine a return route. Similar to the first route with the parcel, the return route may be the shortest distance from the current location (release destination) and the source location while avoiding any blockages. In some embodiments, the return route includes the AGV 714 moving to a perimeter track on the grid and increasing the speed of the AGV 714 above the maximum speed used by the AGV 714 when carrying a parcel. In another embodiment, there are multiple source locations, and determining the return route may include determining the nearest source location, which may be the same or different from the last source location at which the AGV 714 was present. The return route may be determined by a remote computing system or by AGV 714.

The second tier 730 and a third tier 750 of system 700 may be similar to the second tier 130 and the third tier 150 of system 100. Details discussed with respect to the second tier 130 and the third tier 150 of system 100 may equally apply to the second tier 730 and the third their 750 of system 700. Similarly, details discussed with respect the first tier 110 that are not specific to the Cartesian robot sorter may equally apply to the first tier 710 of system 700.

One advantage of using AGVs is the ability to operate multiple AGVs contemporaneously over the same grid with a lower likelihood of interference between individual AGVs compared to the risk of interference between multiple gantry heads in system 100. This is particularly advantageous as the number of accumulation containers 732 increases, which may involve a utilizing a greater number of AGVs to achieve the same throughput. Additionally, because the motion of AGVs over the grid is easily modelable with a high fidelity, it is possible to plan highly efficient movement schedules for multiple AGVs moving across the grid at the same time.

Figure 8:
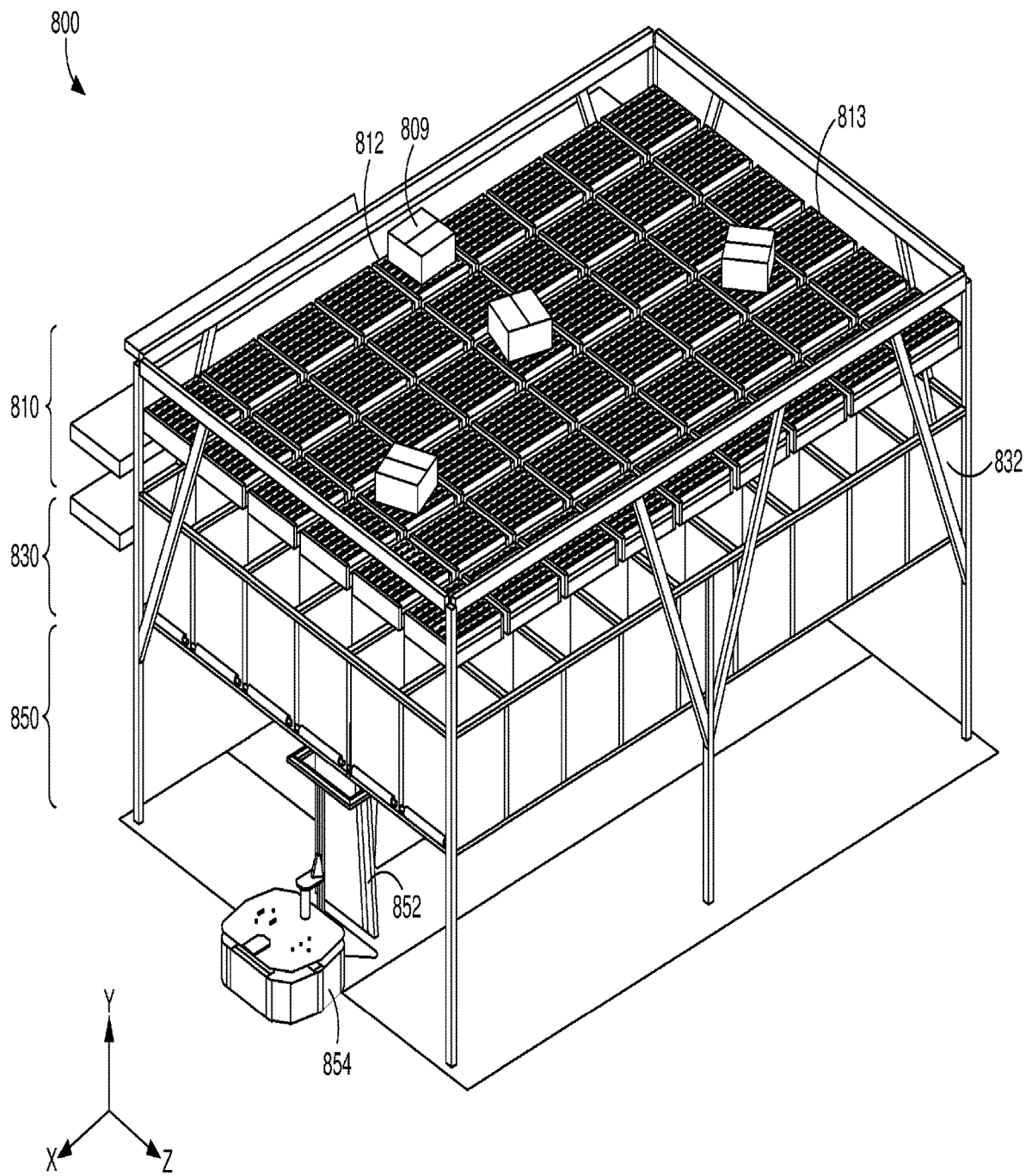
FIG. 8 depicts a perspective view of an example multi-tiered automated parcel sortation system in accordance with an aspect described herein.
Figure 9:
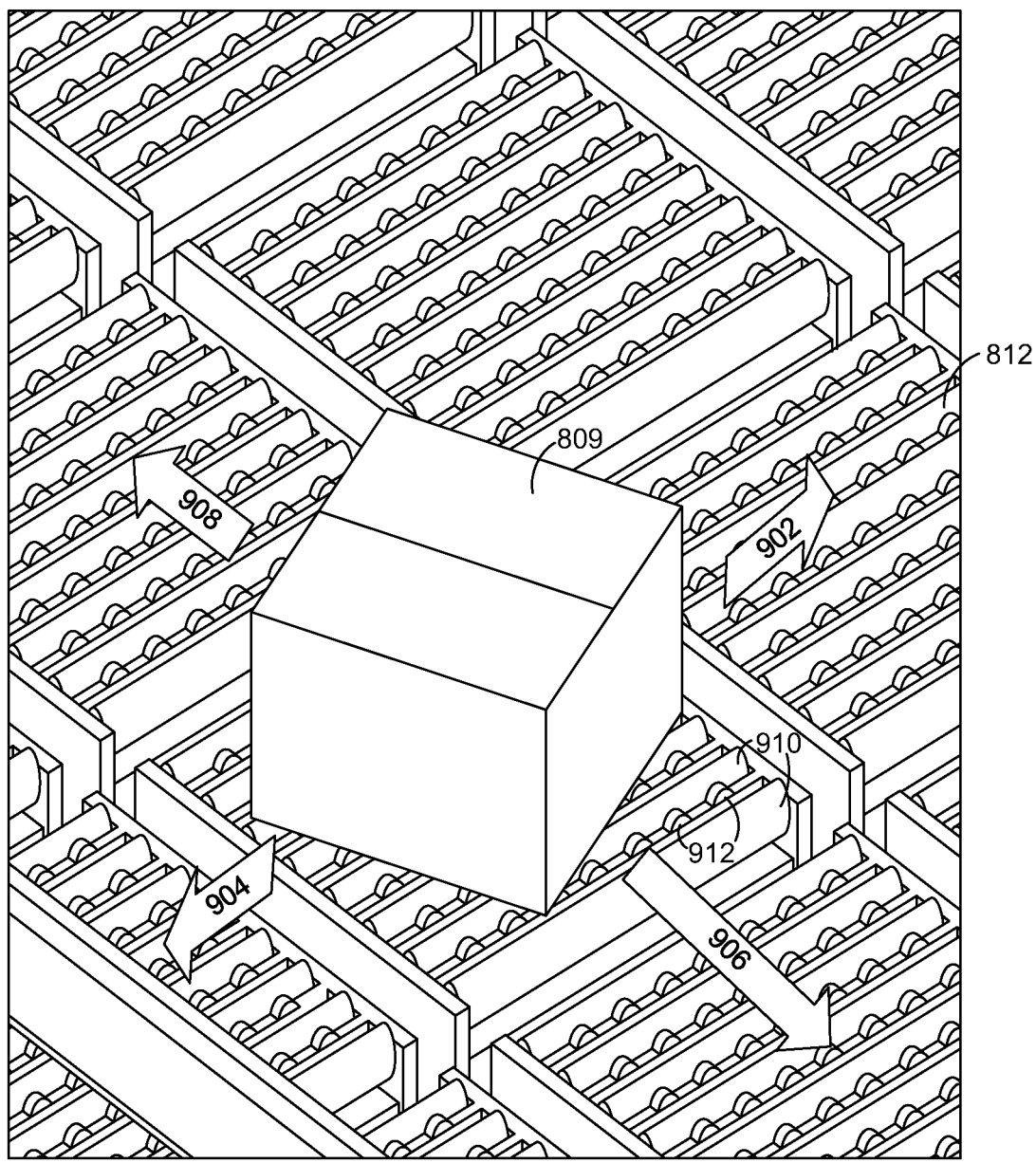
FIG. 9 depicts a parcel being transported on the first tier of the example automated parcel sortation system of FIG. 8, in accordance with an aspect described herein.

FIG. 8 depicts an automated parcel sortation system 800 that is similar to system 100 of FIG. 1 except that the first tier 810 utilizes a different mechanism to transport parcels from a source location to a release location (i.e., an area positioned directly over the assigned accumulation container). Rather than utilizing a Cartesian robotic system with one or more gantry heads, the first tier 810 includes omnidirectional transfer units (OTUs) 812 that collectively form a grid. OTUs 812 may also be referred to as omnidirectional transfers or omnidirectional conveyors. The OTUs 812 are configured to convey a parcel along a primary axis (e.g., x-axis) in either direction, such as direction 902 and 904 in FIG. 9, and along an axis perpendicular to the primary axis (e.g., z-axis) in either direction, such as direction 906 and 908 in FIG. 9. In some instances, the OTUs 812 may further be configured to convey a parcel along any vector between those two axes.

Each OTU 812 is individually controlled such that the drive direction and speed of a given OTU 812 may be different than the drive direction and speed of adjacent OTUs. Each OTU 812 operates with a plurality of rotating members and, in some aspects, lifting mechanisms that alternatively lift the rotating members. The rotating members may comprise sequential pairs of rollers and wheels, sequential pairs of rollers and belts, omnidirectional wheels (commonly known as omni-wheels, Mecanum® wheels, or Rotacasters®), and the like. In some embodiments, not only are the OTUs individually controllable, but subsets of rotating members and, in some embodiments, lifting mechanisms, may be individually controllable. For example, an OTU 812 may include a first subset of rollers and wheels (e.g., 910) rotating in one direction and/or orientation while another subset of rollers and wheels (e.g., 912) are rotating in another direction and/or orientation or are stationary.

Each omnidirectional transfer unit (OTU) 812 may be vertically aligned with an accumulation container 832. In this way, a parcel may be moved along the grid from a source location to a release OTU 812, which is the OTU 812 that is positioned directly over the accumulation container 832 corresponding to the shipping destination of the parcel. A parcel may be initially placed onto the grid of OTUs 812 through a singulation mechanism. For example, parcels may be spaced apart along a conveyor that dumps a single parcel onto an OTU 812 immediately adjacent the conveyor. In another instance, the parcels may be bundled in a pile, and small robotic arm may pick up a parcel from the pile and place it onto an adjacent OTU 812 on the grid.

The parcel is moved across the grid by automatically adjusting different sets of rotating members across different OTUs 812. These adjustments are based on the route that the parcel needs to take to traverse the grid to reach the release OTU 312. As such, similar to using AGVs as the automated sorter in system 100, a route of the parcel may be determined. The route may be determined in a similar manner as described previously, such as by applying an algorithm or one or more machine learning models to automatically determine a route with the shortest distance between the source location and release OTU 812 while avoiding any blockages, such as other parcels traversing the grid or broken or non-operational OTUs 812. As such, the route may be based on the position of the release OTU 812 and the position of OTUs that another parcel may be currently on or will be on in the future, which may be based on the current or future routes of other parcels. This route may be determined using the algorithm or machine learning model by a remote computer system that sends an indication to any participating OTUs (i.e., any OTUs along the determined route) to adjust the rotating members in a manner to achieve the route.

Figure 10:
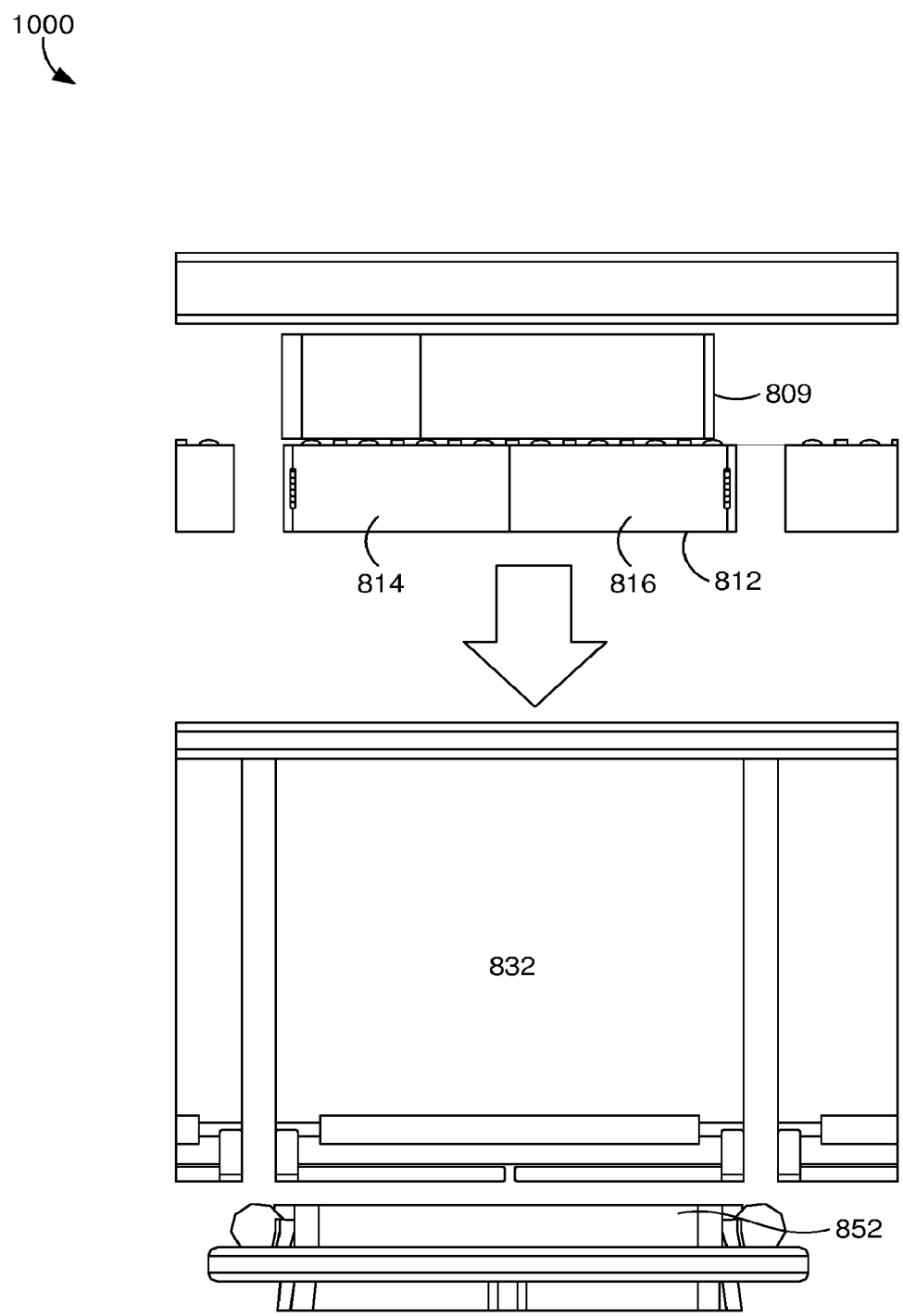
FIG. 10 depicts a side view of a parcel in the first tier of the example automated parcel sortation system of FIG. 8 when it is positioned over an accumulation container within the example automated parcel sortation system, in accordance with an aspect described herein.

Once the parcel is positioned on a release OTU 812 that is directly above the assigned accumulation container 832, the OTU 812 is adjusted to temporarily create an opening within the grid so that the parcel may drop down into the accumulation container 832. FIG. 10 depicts a side view of a parcel 809 that has reached the release OTU 812 positioned directly over the assigned accumulation container 832. At least a segment of the OTU 812 will break away or be removed to allow the parcel to drop down into the accumulation container 832. The OTU 812 may achieve this action through any of the door-opening or tray-opening mechanisms previously discussed with respect to the bottom door of accumulation container 132 of system 100 and the tray of AGV 714 of system 700. For instance, in one embodiment, each OTU 812 itself may function as a set of bomb-bay style doors. As such, each OTU 812 may comprise a first half forming a first door (e.g., door 814) and a second half forming a second door (e.g., door 816), wherein each door is secured to the rest of the grid along one side while being unattached to the grid along the three other sides. Each door may be configured to pivot outward to create the opening within the grid. Only part of each OTU 812 may serve as one or more doors such that each OTU 812 has a static or non-moving portion. In some aspects, each OTU 812 has only one door that is coupled, via a hinge, to a non-moving portion of OTU 812 or a stationary part of rest of the grid.

The second tier 830 and the third tier 850 of system 800 may be similar to the second tier 130 and the third tier 150 of system 100. For instance, FIG. 8 illustrates an AGV 854 (also referred to as a transport AGV 854) with a transport container 852 in the third tier 850. In another embodiment, the third tier 850 may include one or more conveyor belts, similar to conveyors shown in FIG. 6. As such, details discussed with respect to the second tiers and the third tiers of system 100 and 700 may equally apply to system 800. Additionally, details discussed with respect to the first tier 110 that are not specific to the Cartesian robot sorter or details discussed with respect to the first tier 710 that are not specific to AGVs may equally apply to the first tier 810 of system 800.

One advantage of using a grid of OTUs as the automated parcel sorter for first tier 810 is that each unit or cell of the grid can be potentially in a useful state at all times—either moving a parcel, dumping a parcel into an accumulation container, or ready for a parcel to be conveyed to it. Additionally, in some embodiments, the OTUs may be designed so that a parcel can start to be conveyed onto the OTU before the last parcel is fully released into an accumulation container, enabling parcels to be conveyed and released in an almost continuous manner. In other words, the number of cells in the grid that are doing useful work is maximized, and the capacity of the automated sorter (first tier 810) is greatly increased over that of a single-endpoint system. Additionally, work and time is not wasted returning a transporting unit, such as an AGV or gantry head, to a source location. Using OTUs also increases the number of routes any parcel may take to reach a destination, such as the source location or the release destination, such that there may be more opportunities to reduce interference from blockages.

Figure 11:
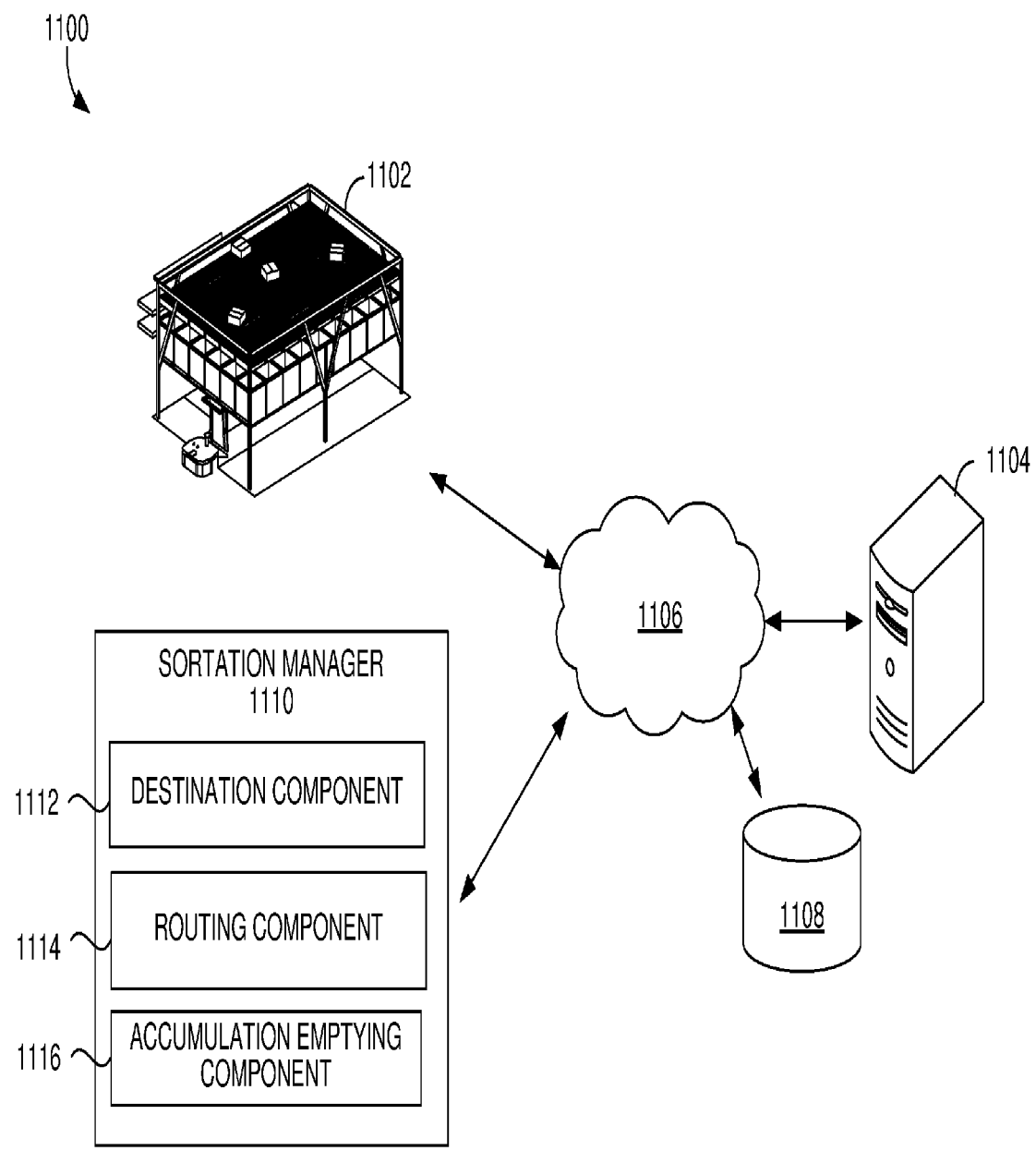
FIG. 11 depicts an example computerized operating environment employing a multi-tiered automated parcel sortation system, in accordance with an aspect described herein.

FIG. 11 depicts a block diagram of example operating environment 1100 for parcel sortation using a multi-tiered automated parcel sortation system. Illustrated in the example operating environment 1100 is a multi-tiered automated parcel sortation system 1102. Example embodiments of multi-tiered automated parcel sortation system 1102 comprises a three-tiered structural sortation system having an automated sorter, a plurality of accumulation containers, and a transport mechanism to remove accumulation of parcels out of the sortation area to further processing. Embodiments of multi-tiered automated parcel sortation system 1102 include example multi-tiered automated parcel sortation systems 100, 700, and 800 in FIGS. 1-6, 7, and 8, respectively.

Operating environment 1100 further includes a sortation manager 1110 that performs various functions for carrying out parcel sortation via automated parcel sortation system 1110. Embodiments of sortation manager 1110 include container assigning component 1112, routing component 1114, and accumulation emptying component 1116. Container assigning component 1112 is configured to assign a particular parcel to an accumulation container within the automated parcel sortation system 1102. Assigning the parcel to an accumulation container may include determining a shipping or mailing destination of the parcel (which may be based on data obtained during a scan of the parcel) and identifying an accumulation container that is associated with that shipping or mailing destination. Associations between containers and destinations or groups of destinations may be stored and retrieved from storage, such as data store 1108. Additionally, in some embodiments, the destination information for a given parcel is received from storage, such as data store 1108.

Routing component 1114 of sortation manager 1110 is configured to determine one or more routes for an automated sorter within the automated parcel sortation system 1102. One route determined may be a release route. A release route is the route the automated sorter or parcel makes across the first tier of the automated parcel sortation system 1102 from a source location (where a parcel is received into the first tier) or a release destination (where a parcel is released into an accumulation container in the second tier). In exemplary embodiments, the release route is determined by applying an algorithm or one or more machine learning models to automatically determine a route with the shortest distance between the current or source location and the release destination. In some embodiments, the release route further considers any blockages, such as other gantry heads, AGVs, or parcels on OTUs. Another type of blockage considered in determining the route may include any mechanically broken or otherwise inoperable areas, such as track areas or OTUs.

In some embodiments, such as embodiments in which the automated sorter comprises a Cartesian robot or an AGV, the routing component is configured also to determine a return route. A release route is a route an automated sorter makes to return from a release destination after releasing a parcel to a source destination. The return route may be the shortest distance from the current location (i.e., the last release destination) to the source location while avoiding any blockages. In some embodiments, determining the return route includes determining a position along the perimeter of the first tier that is the shortest distance from the current position of the sorter and determining the route from the identified position on the perimeter to a source location. By utilizing the perimeter on the return track, sorters may be less likely to block other sorters and may be able to increase speed. In some embodiments, there are multiple source locations, and determining the return route may include determining the nearest source location, which may be the same or different from the last source location. Similar to the release route, the return route may be planned to avoid any blockages, due to other sorters or parcels or inoperable areas.

Accumulation emptying component 1116 is configured to cause the release of accumulated parcels within an accumulation container once the accumulation container has sufficient fill. In some embodiments, accumulation emptying component 1116 determines when an accumulation container is ready to be emptied using a fill or accumulation measurement. Accumulation emptying component 1116 may receive data relating to a current fill or accumulation in an accumulation container and determine whether the current measurement(s) satisfies an accumulation threshold. In some embodiments, the accumulation threshold is a threshold weight, a threshold volume, and/or a threshold distance (e.g., the total height of an accumulation of parcels within the accumulation container or distance from the top of an accumulation of parcels to the top of the accumulation container). The current fill or accumulation data for accumulation containers may be received by one or more sensors, such as weight and/or camera sensors, within the automated parcel sortation system 1102 as discussed with respect to system 100. In some embodiments, the known volume and/or weight of the parcels (which may be determined prior to sortation) may be input into one or more models to determine when the accumulation container likely satisfies the accumulation threshold.

In some embodiments, once it is determined that the accumulation container is ready or nearly ready to be emptied, accumulation emptying component 1116 may signal to a parcel transporter, such as an AGV or AMR, to travel through the third tier of the automated parcel sortation system 1102 to be positioned underneath the filled accumulation container. Accumulation emptying component 1116 may also signal to the accumulation container to open a bottom door to release the accumulated parcels into the third tier area. The parcel transporter may include a transport container, such as a mesh bag, or a platform for receiving parcels and transporting the parcels out of the third tier area. In some embodiments, the parcel transporter is a conveyor belt, as depicted in FIG. 7. Accumulation emptying component 1116 may signal placement of and/or movement of a transport container on the conveyor to a position underneath the accumulation container. Alternatively, the parcels may be emptied from the accumulation container directly onto the conveyor positioned beneath the accumulation container.

In some embodiments, the accumulation emptying component 1116 signals to a parcel transporter upon satisfaction of a first accumulation threshold and then signals for release of parcels from the accumulation container upon satisfaction of a second accumulation threshold that is greater than the first accumulation threshold. In this way, accumulation emptying component 1116 can initiate movement of a parcel transporter towards the accumulation container while the accumulation container is still being filled such that, as soon as the accumulation container is sufficiently filled, the parcels can be released into a parcel transporter that is already positioned under the container.

Sortation manager 1110 represents one or more computing devices that operate to perform the functions described herein. Though represented as a single component, sortation manager 1110 can be distributed in nature. That is, one or more functions may be performed by a single component or by a plurality of distributed components. The single component or distributed components may be integrated into physical structures within the automated parcel sortation system 1102, such as an AGV or accumulation container. Additionally or alternatively, one or more of these functions may carried out by one or more remote computing devices, such as remote processor 1104, via network 1106. Network 1106 encompasses any form of wired or wireless communication. Wireless communication examples include one or more networks, such as a public network or virtual private network "VPN." Network 1106 may include one or more local area networks (LANs), wide area networks (WANs), or any other communication network or method. In addition to Wi-Fi, other wireless examples include Bluetooth and infrared communication methods.

Whether integrated directly into automated parcel sortation system 1102 or in remote devices, sortation manager 1110 generally includes at least one processor that executes instructions stored on computer memory. An example of a system performing one or more components of sortation manager 1110 includes computing device 1300 of FIG. 13.

It should be understood that operating environment 1100 shown in FIG. 11 is an example of one suitable operating environment, and that other arrangements, including more or less components, are also suitable. Other arrangements and elements (e.g., machines, interfaces, functions, orders, and groupings of functions, etc.) can be used in addition to or instead of those shown, and some elements may have been omitted in FIG. 11 altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 13.

Figure 12:
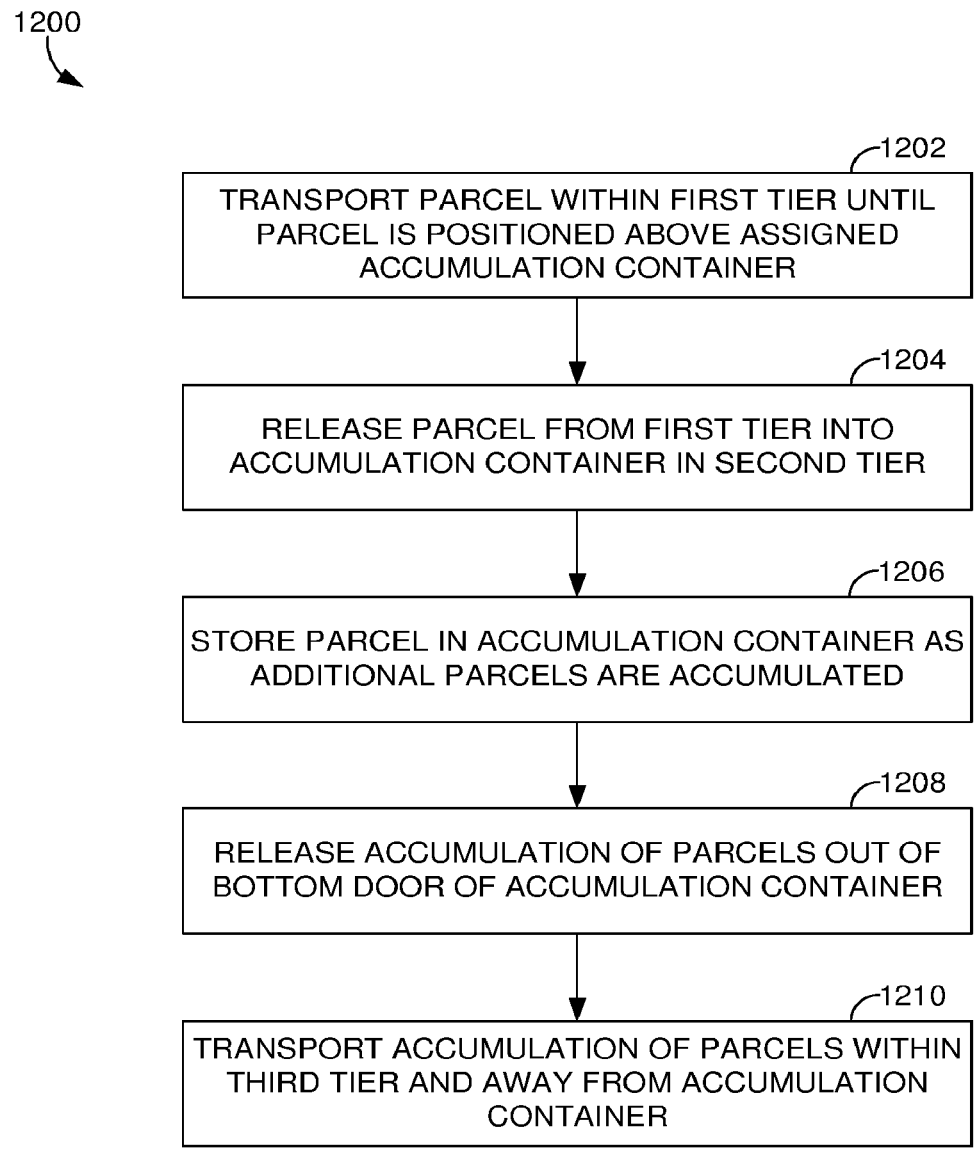
FIG. 12 depicts a flow diagram illustrating an example method for sorting parcels in accordance with an aspect described herein.

FIG. 12 depicts a flow diagram illustrating an example method 1200 of sorting parcels in accordance with one or more embodiments of this disclosure. Method 1200 may be performed, for example, by one or more components of automated parcel sortation system 1102 of FIG. 11 and/or any of the other automated parcel sortation systems disclosed herein. Further, one or more steps of method 1200 may be performed or initiated by sortation manager 1110 in FIG. 11. In this way, method 1200 may include steps that correspond to (e.g., are initiated by) different functions performed by the same or different hardware components on one computing device, which may be a user device or a remote server. Additionally or alternatively, some or all of these steps in these methods may be performed on hardware components of different computing devices such that these methods may be performed in a distributed fashion.

At block 1202, a parcel is transported along a horizontal plane within a first tier such that the parcel is positioned above an accumulation container associated with the parcel's shipping destination. Block 1202 may be performed by an automated sorter at a first tier within a sortation system. In some embodiments, block 1202 is performed by a gantry head moving within a gantry, such as gantry heads 116A-B and gantry 111 in FIG. 1. In other embodiments, block 1202 may be performed by an autonomous guided vehicle, such as AGV 714 in FIG. 7. For instance, the first tier may include a plurality of tracks forming a grid with openings between the tracks, and an AGV carrying a parcel may traverse the tracks until it reaches an opening within the tracks above the accumulation container assigned to the shipping destination of the parcel. Alternatively, block 1202 may be performed by one or more omnidirectional transfer units (OTUs), such as OTUs 812 in FIG. 8. Each OTU may include sets of wheels and/or sets of rollers as well as lifts to transport parcels from one OTU to an adjacent OTU until the parcel is on an OTU that is positioned above the accumulation container assigned to the shipping destination of the parcel.

Block 1202 may include transporting a parcel along a route from a source location to a release destination positioned above the accumulation container corresponding to the parcel's shipping destination. As such, block 1202 may include determining the release destination of the parcel and determining the route a parcel will take across the horizontal plane of the first tier. These aspects of block 1202 may be performed by container assigning component 1112 and routing component 1114, respectively, of FIG. 11. In example embodiments, the route (which may be referred to herein as a release route) is determined by applying an algorithm or one or more machine learning models to automatically determine a route with the shortest distance between the current or source location and the release destination. In this way, block 1202 may be performed automatically by an automated sorter device without user interaction. In some embodiments, the release route further considers any blockages, such as other gantry heads, AGVs, or parcels on OTUs. Another type of blockage considered in determining the route may include any mechanically broken or otherwise inoperable areas, such as track areas or OTUs.

At block 1204, the parcel may be released from the automated sorter in the first tier to an accumulation container in the second tier. The accumulation tier may have a top opening through which the parcel enters and a bottom door. Block 1204 may be performed as described with respect to FIGS. 1-8 and 10. Block 1204 may be performed by the automated sorter, such as a gantry head, AGV, or OTU, carrying the parcel and may be done automatically and without user interaction once the parcel reaches the release destination within the first tier.

At block 1206, an accumulation of parcels are received and stored in the accumulation container in the second tier. The parcels released in block 1204 is stored within the accumulation container as additional parcels are transported around the first tier and received into the accumulation container. At block 1208, the bottom door of the accumulation container is opened to release the accumulation of parcels within the container in to the third tier. Block 1208 may be performed as described with respect to FIGS. 1-8 and 10. Some aspects of block 1208 may be performed by or initiated by accumulation emptying component 1116 of FIG. 11. Further, embodiments of block 1208 may include determining that the accumulation within the accumulation container satisfies an accumulation threshold. In some embodiments, the accumulation threshold is a threshold weight, a threshold volume, and/or a threshold distance (e.g., the total height of an accumulation of parcels within the accumulation container or distance from the top of an accumulation of parcels to the top of the accumulation container). Accumulation data for the accumulation container may be received by one or more sensors, such as weight and/or camera sensors. Alternatively, the known volume and/or weight of the parcels (which may be determined prior to sortation) may be input into one or more models to determine when the accumulation container likely satisfies the accumulation threshold.

After the bottom door of the accumulation container opens, the accumulation of parcels within the container may be released into at the third tier. At block 1210, the accumulation of parcels is transported within the third tier away from the accumulation container. The parcels may be transported via a transport container as described with respect to FIGS. 5A-B and 6. The transport container may be positioned underneath the accumulation container releasing the parcels by an autonomous guided vehicle (AGV), and the AGV may also transport the received accumulation of parcels to an area on the perimeter of or outside of the sortation system so that the accumulation of parcels may be further processed and/or sorted and transported to the correct destination. Alternatively, a transport container may be placed on a conveyor positioned underneath the accumulation container. Once the parcels are released from the accumulation container and received in the transport container, the conveyor may move the parcels within the transport container to an area on the perimeter of or outside of the sortation system. In another embodiment, the conveyor placed under the accumulation container does not include a transport container such that the accumulation of parcels are received and moved as a pile of parcels.

Figure 13:
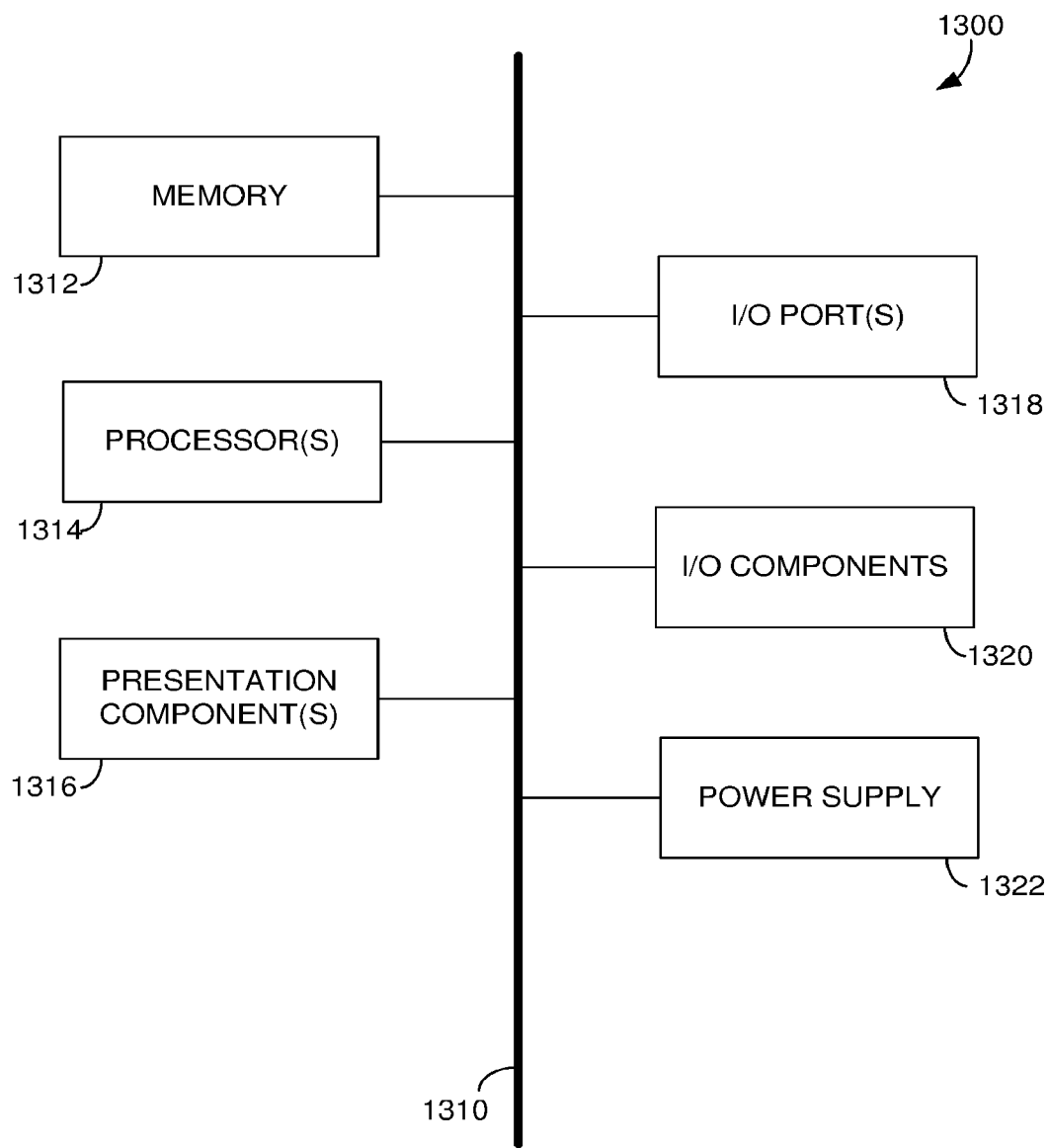
FIG. 13 is a block diagram of an example computing device suitable for use with aspects of the present technology.

With reference to FIG. 13, an example computing device 1300 is provided. Computing device 1300 includes bus 1310 that directly or indirectly couples the following devices: memory 1312, one or more processors 1314, one or more presentation components 1316, input/output ports 1318, input/output components 1320, and illustrative power supply 1222. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The diagram of FIG. 13 merely illustrates an example computing device that can be used in connection with one or more embodiments of the present technology. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer storage media in the form of volatile or nonvolatile memory. The memory may be removable, non-removable, or a combination thereof. Example hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device such as, for example, through a graphic user interface. Examples of presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc.

Example embodiments described and derived from the description above may include one or more of the following:

Embodiment 1: An automated parcel sortation system comprising: a first tier comprising an automated parcel sorter configured to transport a plurality of parcels, each parcel having an assigned shipping destination; a second tier positioned directly beneath the first tier and comprising a plurality of accumulation containers, each accumulation container being associated with a shipping destination; and a third tier comprising a parcel accumulation transporter positioned directly beneath the second tier and configured to transport an accumulation of parcels received from an accumulation container towards a perimeter of the automated parcel sortation system; wherein the automated parcel sorter is configured to transport a parcel to a position directly above the accumulation container that corresponds to the shipping destination assigned to the parcel, the automated parcel sorter further configured to release the parcel into the accumulation container; wherein each accumulation container is configured to hold the accumulation of parcels and release the accumulation of parcels to the parcel accumulation transporter when an accumulation threshold within the accumulation container is satisfied.

Embodiment 2: Embodiment 1, wherein the automated parcel sorter comprises a plurality of omnidirectional transfer units arranged adjacent one another to form a grid that is horizontally oriented, each omnidirectional transfer unit being configured to move a parcel in each direction along at least two axes. In accordance with Embodiment 2, each omnidirectional transfer unit may be positioned directly above an accumulation container within the plurality of accumulation containers.

Embodiment 3: Embodiment 2, wherein the automated sorter further comprises a computerized sortation manager communicatively coupled to the plurality of omnidirectional transfer units, wherein the computerized sortation manager is configured to determine a route from a source location at which the parcel is received on the grid to the position above the accumulation container corresponding to the shipping destination assigned to the parcel.

Embodiment 4: Any of embodiments 2-3, wherein each omnidirectional transfer unit is at least partially detachable from the grid.

Embodiment 5: Embodiment 4, wherein each omnidirectional transfer unit comprises a first portion forming a first door and a second portion forming a second door, wherein each of the first door and the second door are configured to at least partially open a create a temporary opening within the grid, wherein the parcel positioned on the omnidirectional transfer unit is released into the second tier when the temporary opening is created.

Embodiment 6: Any of Embodiments 2-5, wherein each OTU comprises a plurality of rollers and wheels partially exposed along a top surface of the OTU and one or more mechanisms to lift at least a subset of the rollers and wheels.

Embodiment 7: Any of Embodiments 2-5, wherein each OTU comprises a plurality of multi-directional wheels configured to roll in each direction along the at least two axes.

Embodiment 8: Any of Embodiments 2-7, wherein each omnidirectional transfer unit is configured to lower downward from the horizontal plane of the grid to release a parcel into the accumulation container.

Embodiment 9: Embodiment 1, wherein the automated parcel sorter comprises: a plurality of tracks that intersect to form a grid that is horizontally oriented, the grid comprising openings between the tracks that are each positioned above an accumulation container within the plurality of accumulation containers; and one or more autonomous guided vehicles configured to traverse the grid along the plurality of tracks.

Embodiment 10: Embodiment 9, wherein the one or more autonomous guided vehicles are each configured to determine a route from a source location at which the autonomous guided vehicle receives the parcel to the position above the accumulation container corresponding to the shipping destination assigned to the parcel.

Embodiment 11: Embodiment 10, wherein each autonomous guided vehicle determines the route by receiving the route from a remote computer system.

Embodiment 12: Any of Embodiments 9-11, wherein the one or more autonomous guided vehicles comprises a plurality of autonomous guided vehicles that contemporaneously traverse the grid along different routes, wherein the plurality of parcels are transported in parallel or serially by the plurality of autonomous guided vehicles.

Embodiment 13: Any of embodiments 9-12, wherein each autonomous guided vehicle determines a route by automatically applying an algorithm using the shipping destination to determine a route with the shortest distance between the source location and the position above the accumulation container while avoiding any blockages from one or more additional autonomous guided vehicles.

Embodiment of 14: Any of embodiments 9-13, wherein each autonomous guided vehicle is configured to determine a return route from the position above the accumulation container to a return source location, the return source location being either the same source location from where the autonomous guided vehicle received the parcel or a different source location.

Embodiment 15: Any of embodiments 9-14, wherein each autonomous guided vehicle comprises a body, a tray forming a lower portion of the body and configured to hold a parcel, and a tray opening mechanism configured to move the tray when the tray is positioned over the accumulation container corresponding to the shipping destination assigned to the parcel held within the tray.

Embodiment 16: Embodiment 15, wherein the tray comprises one or more hinged doors and wherein the tray opening mechanism causes the hinged doors to rotate open to release the parcel positioned on the one or more hinged doors.

Embodiment 17: Embodiment 16, wherein the one or more hinged doors comprise two hinged doors that are coupled to opposite sides of the body of the autonomous guided vehicle such that when the hinged doors rotate, the two hinged doors rotate away from one another.

Embodiment 18: Embodiment 15, wherein the tray comprises a flexible door formed from plurality of ridged members, the flexible door being configured to roll around itself towards a side of the body of the autonomous guided vehicle to release the parcel.

Embodiment 19: Embodiment 15, wherein tray comprises a first plate and a second plate that each have an aperture, the first plate and the second plate being parallel to each other and arranged so that the apertures of each plate align with one another, the two parallel plates being connected along the perimeter by a flexible material, wherein the tray opening mechanism rotates at least the first parallel plate relative to the second parallel plate to open and close the tray; wherein when open, a tunnel is formed between the apertures of the first and second plates; and wherein the flexible material is positioned between the apertures of the first and second plates when the first parallel plate is rotated closed. Embodiment 20: Embodiment 15, wherein the tray comprise two panels positioned adjacent each other, wherein the tray opening mechanism comprises a pair of pneumatic cylinders that each rotate along one axis to push an adjoining panel out sideways along a horizontal plane. Embodiment 21: Embodiment 20, wherein the pair of pneumatic cylinders each further rotate along a second axis to push the adjoining panel downwards.

Embodiment 22: Any of the Embodiments 1-22, wherein the parcel accumulation transporter of the third tier comprises a conveyor. Embodiment 23: Any of the Embodiments 1-22, wherein the parcel accumulation transporter of the third tier comprises an autonomous guided vehicle that includes a transport container, wherein the autonomous guided vehicle is configured to position the transport container directly beneath the accumulation container and configured to transport the accumulation of parcels that are released into the transport container.

Embodiment 24: An automated parcel sortation system comprising: a first tier comprising a plurality of omni-directional transfer units (OTUs) arranged to form a grid that is horizontally oriented, each OTU comprising one or more of wheels and rollers to transport a parcel on the grid, the parcel being assigned a shipping destination; a second tier positioned directly beneath the first tier and comprising a plurality of accumulation containers, each accumulation container being associated with a shipping destination, wherein the parcel is transported across the grid to a release OTU that is positioned directly above a first accumulation container associated with the shipping destination assigned to the parcel; and a third tier comprising a parcel accumulation transporter positioned directly beneath the second tier and configured to transport an accumulation of parcels received from the first accumulation container towards a perimeter of the automated parcel sortation system; wherein a partially removable portion of the release OTU is configured to move to create a temporary opening within the grid, wherein the parcel is released from the first tier into the second tier via the temporary opening.

Embodiment 25: Embodiment 24, wherein the parcel accumulation transporter comprises a conveyor. Embodiment 26: Embodiment 24, wherein the parcel accumulation transporter comprises an autonomous guided vehicle. Embodiment 27: Any of embodiments 24-26, wherein the first accumulation container is configured to hold the accumulation of parcels and configured to release the accumulation of parcels to the parcel accumulation transporter when an accumulation threshold is satisfied, the accumulation threshold being one or more of an accumulation volume threshold, an accumulation weight threshold, and an accumulation height threshold. Embodiment 28: Any of Embodiments 24-27, wherein the partially removable portion of the release OTU comprises one or more doors each rotatably coupled the release OTU and configured to open to create the temporary opening within the grid.

Embodiment 29: A method for sorting parcels, the method comprising: at a first tier and by an automated sorter device without user interaction, transporting a parcel along a horizontal plane to position the parcel above an accumulation container associated with a shipping destination of the parcel, the accumulation container being positioned within a second tier and having a top opening and a bottom door; at the first tier and by the automated sorter device without user interaction, releasing the parcel from the first tier into the top opening of the accumulation container; at the accumulation container in the second tier, receiving and storing an accumulation of parcels comprising the parcel and additional parcels; at the second tier, automatically and without user interaction, opening the bottom door of the accumulation container to release the accumulation of parcels to a third tier; and at the third tier, transporting the accumulation of parcels away from the accumulation container.

Embodiment 30: Embodiment 29, wherein the bottom door of the accumulation container is opened upon determining that the accumulation of parcels within the accumulation container satisfies an accumulation threshold. Embodiment 31: Any of Embodiments 29-30, wherein the automated sorter device comprises an autonomous guided vehicle that moves along a plurality of tracks to transport the parcel across the first tier, the autonomous guided vehicle transporting the parcel according to a route determined for the parcel based at least in part on the shipping destination of the parcel. Embodiment 32: Any of Embodiments 29-30, wherein the automated sorter device comprises a plurality of omnidirectional transfer units (OTUs) each comprising one or more of wheels and rollers to transport the parcel to an adjacent OTU.

Embodiment 33: An automated sorter for sorting parcels, the automated sorter comprising: a body comprising: a tray oriented horizontally and forming a lower portion of the body, the tray being configured to hold a parcel, and a tray opening mechanism configured to move the tray when the automated sorter is positioned at a predetermined release destination, wherein when the tray is moved, a parcel positioned on the tray is released downwards away from the body of the automated sorter. The automated sorter of embodiment 33 further comprising: a plurality of wheels secured to the body; a route component configured to determine a route of the automated sorter to the predetermined destination; and an automated steering component configured to steer the body of the automated sorter according to the route.

Embodiment 34: Embodiment 33, wherein the predetermined release destination is determined based on a shipping destination associated with the parcel positioned on the tray. Embodiment 35: Any of Embodiments 33-34, wherein the route component comprises one or more computer readable media and one or more processors, wherein computer readable media comprises instructions that, when executed by the one or more processors, perform a method for automatically determining the route to the predetermined release destination. Embodiment 36: Any of Embodiments 33-35, wherein the route component comprises a sensor configured to receive the route determined at a remote computer.

Embodiment 37: An automated sorter for sorting parcels, the automated sorter comprising: a plurality of omni-directional transfer units arranged adjacent one another to form a grid that is horizontally oriented, each omni-directional transfer unit having a top surface with a plurality of rotating members that move relative to one or more stationary portions of the top surface, wherein the plurality of rotating members are configured to rotate in each direction along at least two axes, wherein each omnidirectional transfer unit is configured to move away from the grid to temporarily create an opening within the grid. Embodiment 38: Embodiment 37, wherein the plurality of rotational members comprises pairs of rollers and wheels, and wherein each omnidirectional transfer unit comprises one or more mechanisms to lift at least a subset of the pairs of rollers and wheels. Embodiment 39: Embodiment 37, wherein the plurality of rotational members comprises pairs of rollers and belts, and wherein each omnidirectional transfer unit comprises one or more mechanisms to lift at least a subset of the pairs of rollers and belts. Embodiment 40: Embodiment 37: wherein the plurality of rotational members comprises a plurality of multi-directional wheels configured to roll in each direction along the at least two axes. Embodiment 41: Any of Embodiments 37-40, wherein each omnidirectional transfer unit comprises a first half forming a first door and a second half forming a second door, wherein each door is secured to the grid along a first side and is unattached to the grid along three other sides, wherein each door is configured to pivot along the first side to create the opening within the grid. Embodiment 42: Any of Embodiments 37-40, wherein each omnidirectional transfer unit comprises a first half forming a first door and a second half forming a second door, wherein each door is configured to lower below the horizontal plane of the grid and slide outward to create the opening within the grid. Embodiment 43: Any of Embodiments 37-42, wherein subsets of rotational members within the plurality of rotational members are independently rotatable, and wherein each omnidirectional transfer unit comprises a receiver configured to receive a signal indicating a direction in which each subset of rotational members are to rotate.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

As used in this disclosure, the word "delivery" is intended to mean both "to drop off" and "to pickup," unless one of the options is impracticable. For example, a "delivery vehicle" is a vehicle capable of picking up a parcel and dropping off a parcel at a location. Words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

It will be understood that certain features and subcombinations are of utility and may be employed without reference to other features and subcombinations. This is contemplated by and is within the scope of the claims. Because many possible embodiments of the described technology may be made without departing from the scope, it is to be understood that all matter described herein or illustrated the accompanying drawings is to be interpreted as illustrative and not in a limiting sense.

What is claimed is:

1. An automated parcel sortation system comprising:
   a first tier comprising a plurality of tracks that intersect to form a grid that is horizontally oriented, and one or more autonomous guided vehicles that traverse the grid along the plurality of tracks;
   a second tier positioned beneath the first tier and comprising a plurality of accumulation containers, each accumulation container of the plurality of accumulation containers being associated with a shipping destination; and
   a third tier comprising a parcel accumulation transporter positioned beneath the second tier and configured to transport an accumulation of parcels received from one of the plurality of accumulation containers towards a perimeter of the automated parcel sortation system,
   wherein the one or more autonomous guided vehicles are each configured to transport a parcel across the grid to a position above an accumulation container of the plurality of accumulation containers that is associated with the shipping destination that corresponds to an assigned shipping destination of the parcel and to release the parcel into the accumulation container.

2. The automated parcel sortation system of claim 1, wherein each of the one or more autonomous guided vehicles is configured to determine a route to the position above the accumulation container that is associated with the shipping destination that corresponds to the assigned shipping destination of the parcel.

3. The automated parcel sortation system of claim 2, wherein each of the one or more autonomous guided vehicles determines the route by receiving the route from a remote computer system.

4. The automated parcel sortation system of claim 3, wherein each of the one or more autonomous guided vehicles is configured to determine a return route from the position above the accumulation container to a return source location.

5. The automated parcel sortation system of claim 1, wherein the one or more autonomous guided vehicles contemporaneously traverse the grid along different routes.

6. The automated parcel sortation system of claim 1, wherein each of the one or more autonomous guided vehicles comprises a body and a tray forming a lower portion of the body that is configured to hold the parcel and release the parcel when the tray is positioned over the accumulation container.

7. The automated parcel sortation system of claim 6, wherein the tray comprises one or more hinged doors.

8. An automated parcel sortation system comprising:
   a first tier comprising an automated parcel sorter configured to transport a plurality of parcels, each parcel of the plurality of parcels having an assigned shipping destination;

a second tier positioned beneath the first tier and comprising a plurality of accumulation containers, each accumulation container of the plurality of accumulation containers being associated with a shipping destination; and a third tier comprising a parcel accumulation transporter positioned beneath the second tier and configured to transport an accumulation of parcels received from one of the plurality of accumulation containers towards a perimeter of the automated parcel sortation system, wherein the second tier is suspended above the third tier, and the automated parcel sorter is configured to transport a parcel to a position above an accumulation container of the plurality of accumulation containers that is associated with the shipping destination that corresponds to the assigned shipping destination the parcel and release the parcel into the accumulation container.

9. The automated parcel sortation system of claim 8, wherein the automated parcel sorter comprises:

a plurality of tracks that intersect to form a grid that is horizontally oriented, the grid comprising openings between the tracks that are each positioned above an accumulation container of the plurality of accumulation containers; and one or more autonomous guided vehicles configured to traverse the grid along the plurality of tracks.

10. The automated parcel sortation system of claim 9, wherein the one or more autonomous guided vehicles contemporaneously traverse the grid along different routes.

11. The automated parcel sortation system of claim 8, wherein the automated parcel sorter comprises a plurality of omnidirectional transfer units arranged adjacent one another to form a grid that is horizontally oriented, and each omnidirectional transfer unit of the plurality of omnidirectional transfer units is configured to move along at least two axes.

12. The automated parcel sortation system of claim 11, wherein the automated parcel sorter further comprises a computerized sortation manager communicatively coupled to the plurality of omnidirectional transfer units, and the computerized sortation manager is configured to determine a route from a source location at which the parcel is received on the grid to the position above the accumulation container associated with the shipping destination that corresponds to the assigned shipping destination of the parcel.

13. The automated parcel sortation system of claim 8, wherein the parcel accumulation transporter of the third tier comprises a conveyor.

14. The automated parcel sortation system of claim 8, wherein the parcel accumulation transporter of the third tier comprises an autonomous guided vehicle that includes a transport container, and the autonomous guided vehicle is configured to position the transport container beneath the one of the plurality of accumulation containers and transport the accumulation of parcels that is received by the transport container from the one of the plurality of accumulation containers.

15. An automated parcel sortation system comprising:

a first tier comprising an automated parcel sorter configured to transport a plurality of parcels, each parcel of the plurality of parcels having an assigned shipping destination; and a second tier positioned beneath the first tier and comprising a plurality of accumulation containers, each accumulation container of the plurality of accumulation containers being associated with a shipping destination, wherein the automated parcel sorter is configured to transport a parcel to a position directly above an accumulation container of the plurality of accumulation containers that is associated with the shipping destination that corresponds to the assigned shipping destination the parcel and to release the parcel into the accumulation container, and each accumulation container of the plurality of accumulation containers is suspended above a third tier comprising a parcel accumulation transporter for transporting an accumulation of parcels received from one of the plurality of accumulation containers towards a perimeter of the automated parcel sortation system.

16. The automated parcel sortation system of claim 15, wherein the one of the plurality of accumulation containers is configured to hold the accumulation of parcels and release the accumulation of parcels to the parcel accumulation transporter when an accumulation threshold for the one of the plurality of accumulation containers is satisfied.

17. The automated parcel sortation system of claim 16, wherein the accumulation threshold is at least one of an accumulation volume threshold, an accumulation weight threshold, or an accumulation height threshold.

18. The automated parcel sortation system of claim 15, wherein the automated parcel sorter comprises:

a plurality of tracks that intersect to form a grid that is horizontally oriented, the grid comprising openings between the tracks that are each positioned above an accumulation container of the plurality of accumulation containers; and one or more autonomous guided vehicles configured to traverse the grid along the plurality of tracks.

19. The automated parcel sortation system of claim 15, wherein the automated parcel sorter comprises a plurality of omnidirectional transfer units arranged adjacent one another to form a grid that is horizontally oriented, and each omnidirectional transfer unit of the plurality of omnidirectional transfer units is configured to move along at least two axes.

20. The automated parcel sortation system of claim 19, wherein each omnidirectional transfer unit of the plurality of omnidirectional transfer units comprises a first door and a second door, and each of the first door and the second door is configured to at least partially open to create a temporary opening within the grid and release the parcel positioned on one of the omnidirectional transfer units into the accumulation container.

* * * * *